United States Patent
Yu et al.

(10) Patent No.: US 12,362,853 B2
(45) Date of Patent: **\*Jul. 15, 2025**

(54) SYSTEMS AND METHODS TO OPTIMIZE THE LOAD OF MULTIPATH DATA TRANSPORTATION

(71) Applicant: Dolby Laboratories Licensing Corporation, San Francisco, CA (US)

(72) Inventors: Mingchao Yu, Sydney (AU); Mark Craig Reed, Gordon (AU)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/390,321

(22) Filed: Dec. 20, 2023

(65) Prior Publication Data

US 2024/0178935 A1   May 30, 2024

Related U.S. Application Data

(63) Continuation of application No. 17/734,517, filed on May 2, 2022, now Pat. No. 11,956,075, which is a
(Continued)

(51) Int. Cl.
*H04L 1/18*   (2023.01)
*H04L 1/00*   (2006.01)
(Continued)

(52) U.S. Cl.
CPC .......... *H04L 1/0041* (2013.01); *H04L 1/0009* (2013.01); *H04L 1/20* (2013.01);
(Continued)

(58) Field of Classification Search
None
See application file for complete search history.

(56) References Cited

U.S. PATENT DOCUMENTS

| 8,396,066 B1 | 3/2013 | Banerjee |
| 8,543,727 B2 * | 9/2013 | Boustead ................ H04L 45/22 370/238 |

(Continued)

FOREIGN PATENT DOCUMENTS

| CN | 1595915 A | 3/2005 |
| CN | 1735079 A | 2/2006 |

(Continued)

OTHER PUBLICATIONS

Kurant, Maciej, Exploiting the Path Propagation Time Differences in Multipath Transmission with FEC 2009, IEEE INFOCOM, pp. 2025-2033.

(Continued)

*Primary Examiner* — Mujtaba M Chaudry

(57) ABSTRACT

A control unit of a multipath data transportation system that optimizes the load of the multiple communication paths of this system when the system transmits a data segment over these paths in parallel with forward error correction. The control unit determines an optimized number of packets to send over each path based on a prediction of quality for each path. The transmitted packets include systematic packets and coded packets.

22 Claims, 21 Drawing Sheets

Related U.S. Application Data continuation of application No. 17/113,553, filed on Dec. 7, 2020, now Pat. No. 11,349,599, which is a continuation of application No. 15/714,303, filed on Sep. 25, 2017, now Pat. No. 10,862,620.

(51) Int. Cl.

| | | |
|---|---|---|
| *H04L 1/20* | (2006.01) | |
| *H04L 69/14* | (2022.01) | |
| *H04L 43/0829* | (2022.01) | |
| *H04L 45/24* | (2022.01) | |
| *H04L 45/302* | (2022.01) | |
| *H04L 47/27* | (2022.01) | |

(52) U.S. Cl.
CPC ...... *H04L 69/14* (2013.01); *H04L 2001/0096* (2013.01); *H04L 43/0829* (2013.01); *H04L 45/24* (2013.01); *H04L 45/302* (2013.01); *H04L 47/27* (2013.01)

(56) References Cited

U.S. PATENT DOCUMENTS

| | | | |
|---|---|---|---|
| 9,455,750 B2 | 9/2016 | Luby | |
| 2003/0226089 A1 | 12/2003 | Rasmussen | |
| 2004/0066754 A1* | 4/2004 | Hottinen | H04B 7/0615 |
| | | | 370/335 |
| 2005/0002357 A1* | 1/2005 | Hu | H04W 28/22 |
| | | | 370/332 |
| 2005/0063378 A1 | 3/2005 | Kadous | |
| 2005/0204251 A1 | 9/2005 | Moon | |
| 2009/0232191 A1* | 9/2009 | Gupta | H04B 10/2575 |
| | | | 375/216 |
| 2010/0325301 A1* | 12/2010 | Kwon | H04L 1/06 |
| | | | 709/231 |
| 2012/0127882 A1 | 5/2012 | Edwards | |
| 2012/0127888 A1 | 5/2012 | Fujishima | |
| 2012/0314578 A1 | 12/2012 | Averi | |
| 2013/0195106 A1 | 8/2013 | Calmon | |
| 2014/0269503 A1 | 9/2014 | Medard | |
| 2015/0010090 A1 | 1/2015 | Sugimoto | |
| 2015/0063211 A1* | 3/2015 | Kim | H04L 45/24 |
| | | | 370/328 |
| 2017/0012884 A1 | 1/2017 | Ho | |
| 2017/0012885 A1 | 1/2017 | Ho | |

FOREIGN PATENT DOCUMENTS

| | | |
|---|---|---|
| CN | 1906870 A | 1/2007 |
| CN | 101166270 A | 4/2008 |
| CN | 101253771 A | 8/2008 |
| CN | 101667904 A | 3/2010 |
| CN | 1875590 A | 10/2010 |
| CN | 102739378 A | 10/2012 |
| CN | 101142774 A | 11/2012 |
| CN | 103281252 A | 9/2013 |
| CN | 101978635 A | 3/2015 |
| EP | 1931148 B1 | 11/2011 |
| EP | 3571769 A1 | 11/2019 |
| GB | 2543840 B | 4/2019 |
| JP | 2013225761 A | 10/2013 |
| WO | 2011071472 A1 | 6/2011 |
| WO | 2011101425 A1 | 8/2011 |

OTHER PUBLICATIONS

Sun, J., et al., DC/\2-MTCP: Light Weight COding for Efficient Multi-Path Transmission in Data Center Network, IEEE International Parallel and Distributed Processing Symposium (IPDPS), XP033113952, p. 419-428, May 29, 2017.

* cited by examiner

SYSTEMS AND METHODS TO OPTIMIZE THE LOAD OF MULTIPATH DATA TRANSPORTATION

RELATED APPLICATIONS

This application is a continuation of U.S. patent application Ser. No. 17/734,517, filed May 2, 2022, which is a continuation of U.S. patent application Ser. No. 17/113,553 filed Dec. 7, 2020, now U.S. Pat. No. 11,349,599, issued on May 31, 2022, which is a continuation of U.S. patent application Ser. No. 15/714,303, filed Sep. 25, 2017, now U.S. Pat. No. 10,862,620, issued on Dec. 8, 2020, which is related to U.S. patent application Ser. No. 15/405,874, filed Jan. 13, 2017, and entitled "SYSTEMS AND METHODS TO GENERATE COPIES OF DATA FOR TRANSMISSION OVER MULTIPLE COMMUNICATION CHANNELS," and is also related to U.S. patent application Ser. No. 15/411,097, filed Jan. 20, 2017, and entitled "SYSTEMS AND METHODS TO OPTIMIZE PARTITIONING OF A DATA SEGMENT INTO DATA PACKETS FOR CHANNGEL ENCODING," the disclosures of which are hereby incorporated herein by reference.

FIELD OF THE TECHNOLOGY

At least some embodiments disclosed herein relate to encoding data for reliable and efficient transmission over a communication system that does not have perfect fidelity, such as a communication system having parallel channels for communications made using forward error correction techniques.

BACKGROUND

Forward Error Correction (FEC) is a coding technique typically used for correcting errors in data transmission over communication channels. Using FEC a sender provides redundant data in the stream of communicated data to enable the recipient to detect errors in the received data and/or recover a copy of the original data from the correctly received data without requiring a reverse communication from the recipient to the sender to request retransmission of missing data or received data that has error.

FEC adds redundant data by transforming the original information into channel-encoded outputs using an algorithm. The original information may or may not appear literally in the encoded output. Outputs that include the unmodified input are systematic, while outputs that do not include the unmodified input are non-systematic. A recipient decodes the non-systematic outputs to reassemble the original information from the received outputs. Rateless erasure codes can potentially generate a limitless sequence of encoding symbols from a given set of original symbols such that the original symbols can be recovered from a subset of the encoding symbols of size equal to or larger than the number of original symbols. The rateless FEC does not have a fixed code rate.

U.S. Pat. No. 9,413,494, entitled "FEC-based Reliable Transport Control Protocols for Multipath Streaming", discloses the transmission of forward-error corrected data, from a server device to a client device, via a plurality of parallel network paths. The client device reports, to the server device, the losses of the data in the network paths for the retransmission of the data lost in the network paths.

U.S. Pat. No. 7,249,291, entitled "System and Method for Reliably Communicating the Content of a Live Data Stream", discloses a method to transmit a live data stream to a recipient using multiple channels, where a forward error correction algorithm is applied to generate FEC-encoded blocks.

U.S. Pat. No. 9,236,885, entitled "Systematic Encoding and Decoding of Chain Reaction Codes", discloses that in certain applications it may be preferable to transmit the source symbols first, and then to continue transmission by sending output symbols. Such a coding system was referred to as a systematic coding system.

U.S. Pat. No. 9,015,564, entitled "Content Delivery System with Allocation of Source Data and Repair Data among HTTP Servers", discloses a source server storing content in a source form, a broadcast sever generating and storing repair symbols, and repair servers requesting broadcast of repair data when byte-range requests from multiple receivers overlap.

U.S. Pat. App. Pub. No. 2010/0094955, entitled "Methods and Systems for using a Distributed Storage to its Maximum Bandwidth", discloses a method to generate multiple coded fractional copies of a data segment, which are stored in multiple storage devices. A subset of the coded copies will be fully downloaded for data recovery, and in case of recovery failure, more coded copies will be fully downloaded.

U.S. Pat. No. 8,078,746, entitled "Distribution Method, Preferably Applied in a Streaming System", discloses a method to generate, at peer receivers of a network, FEC-coded feed packets of the portion of the broadcast data they have received, so that all peer receivers can download sufficient feed packets from any other peer receivers to recover the entire broadcast data.

U.S. Pat. No. 8,996,946, entitled "Application of Fountain Forward Error Correction Codes in Multi-link Multi-path Mobile Networks", discloses a method to generate different on-the-fly FEC encoded packets of a data segment and send these packets through different unreliable paths that are coupled with a receiver until the receiver has acknowledged or the time is out.

U.S. Pat. App. Pub. No. 2014/0269289, entitled "Method and Apparatus for Improving Communication Performance through Network Coding", discloses a method to generate different on-the-fly network coding encoded packets of a data segment and send these packets through different unreliable paths that are coupled with a receiver. The receiver may send intermediate feedback to the transmitter to manage retransmissions. In case the data segment cannot be fully recovered, partial recovery will be attempted.

U.S. Pat. No. 9,455,750, entitled "Source Block Size Selection", discloses techniques to select a source block size to reduce reception overhead in a communication system that partitions a media stream into source blocks of the selected size, divides each of the source block into source symbols that are encoded to generate repair symbols for transmission over a network.

The entire disclosures of the above identified patents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Figure 1:
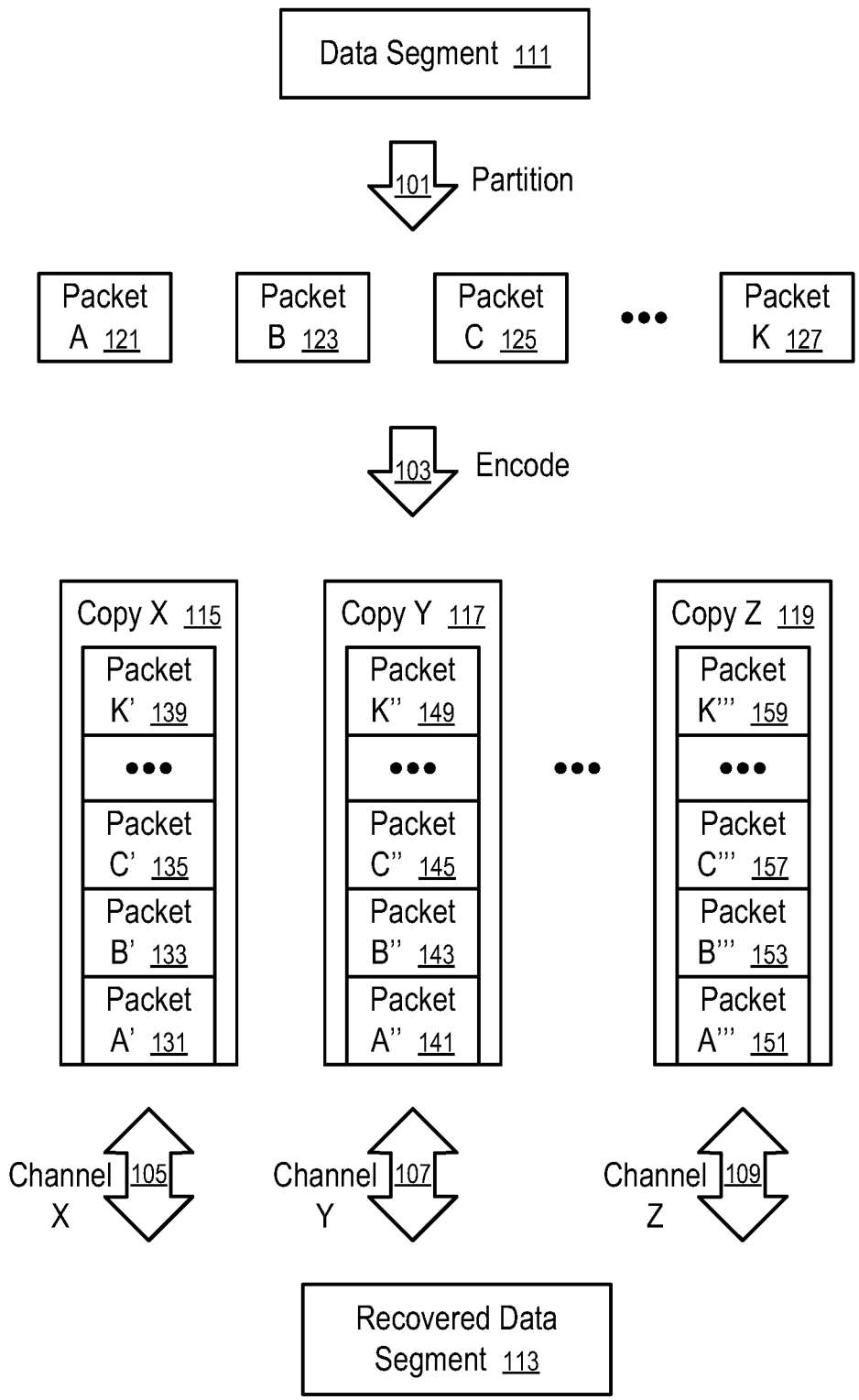
FIG. 1 shows a technique to transmit a data segment via FEC over multiple parallel channels according to one embodiment.

At least some embodiments disclosed herein provide solutions to improve the efficiency, reliability, and overall speed of data transmission via multiple communication channels, in a system as illustrated in FIG. 1. The data transmission technique uses a rateless FEC technique, which partitions the original data segment into original packets of an equal-length and generates channel-coded packets from linear combinations of various subsets of the original packets.

FIG. 1 shows a technique to transmit a data segment via FEC over multiple parallel channels according to one embodiment.

In FIG. 1, a data segment (111) is transmitted via a plurality of parallel communication channels 105, 107, ..., 109). The use of the parallel communication channels (105, 107, ..., 109) generally increases the overall speed of the transmission of the data segment (111).

However, the actual performances of the individual communication channels (105, 107, ..., 109) may vary at the time of transmission. Packets transmitted in one or more of the channels (e.g., 105, 107, ..., or 109) may have longer, random delays than other packets transmitted via others channels (e.g., 105, 107, ..., or 109). As a result, the sequence of the combined set of packets received in a recipient device from the channels (105, 107, ..., 109) is randomized at the time of transmission.

Thus, it is a challenge to schedule the packets for the transmission in the communication channels (105, 107, ..., 109) with reduced redundancy data and a reduced time period during which a sufficient number of useful packets are received via the parallel communication channels (105, 107, ..., 109) for the reconstruction of the recovered data segment (113) that is the same as the original data segment (111).

In FIG. 1, the data segment (111) is partitioned (101), or divided, into a plurality of packets (121, 123, 125, ..., 127) of the same length. Dummy bytes may be padded so that the packets (121, 123, 125, ..., 127) have the same length and thus allow the use of a forward error correction technique. Using a forward error correction technique, the system channel encodes (103) the original packets (121, 123, 125, ..., 127) to generate different channel-encoded copies (115, 117, ..., 119) of the data segment (111) that carry redundant information in the copies (115, 117, ..., 119) for the respective channels (105, 107, ..., 119).

For example, in FIG. 1, a typical channel-encoded packet (e.g., 131, 133, 135, ..., 139; 141, 143, 145, ..., 149; ...; 151, 153, 157, ..., or 159) generated using a typical forward error correction technique is a predetermined function of a random subset of original packets (121, 123, 125, ..., 127). The predetermined function typically generates a linear combination of the subset of the original packets (121, 123, 125, 127) (e.g., through an exclusive or (XOR) operation) as a channel-encoded packet. When a sufficient number of channel-encoded packets are received via the channels (105, 107, ..., 109), the received set of channel-encoded packets can be decoded via the respective forward error correction technique to provide the original set of packets (121, 123, 125, ..., 127) and thus the recovered data segments (113).

In FIG. 1, the individual channels (e.g., 105, 107, ..., or 109) may be reliable in the quality of data transmission (e.g., using a reliable protocol). When there is a missing packet or a packet having an error is received, the retransmission of the missing packet or packet having an error can be requested through any channels (e.g., 105, 107, . . . , or 109) using an appropriate protocol. However, the speed performances of channels (e.g., 105, 107, . . . , or 109) may not be consistent, which incurs delays and duplications to the retransmissions. Embodiments disclosed herein provide solutions to improve the performance of the system by reducing duplicated (and thus useless) data and reducing the time period for the transmission of a sufficient set of useful packets for the recovery of the data segment (113).

In some instances, it is desirable to use separate transmitters to send the copies (115, 117, . . . , 119) through the channels (105, 107, . . . , 109) independently from each other. The transmitters may not have communications with each other to coordinate their transmissions of the copies (115, 117, . . . , 119). The system of FIG. 1 is configured such that when a recipient device receives a combined set of sufficient packets from channels (105, 107, . . . , 109), the recipient device can generate, from the combined set of received packets, the recovered data segment (113) that is the same as the original data segment (111), without having to wait for the completion transmission of the copies (115, 117, . . . , 119). The recipient device may simply terminate its receiving operations before the complete transmission of the copies (115, 117, . . . , 119) and/or request the termination of the transmission operations.

For example, when a combined set of sufficient packets is received for the recovered data segment (113), the recipient device provides an indication to the transmitting system to terminate the transmission of the remaining packets of the copies (115, 117, . . . , 119) in the channels (105, 107, . . . , 109), such that the network resources can be used for other transmission tasks.

For example, the recipient device may use the channels (115, 117, . . . , 119) to request the respective transmitters coupled to the channels (115, 117, . . . , 119) to terminate their transmission of their copies (e.g., 115, 117, . . . , 119). Alternatively, the recipient device may notify a centralized server, using one of the channels (105, 107, . . . , 109) or a separate communication channel, which server then further notifies the respective transmitters coupled to the respective channels (115, 117, . . . , 119) to terminate their transmissions.

Figure 2:
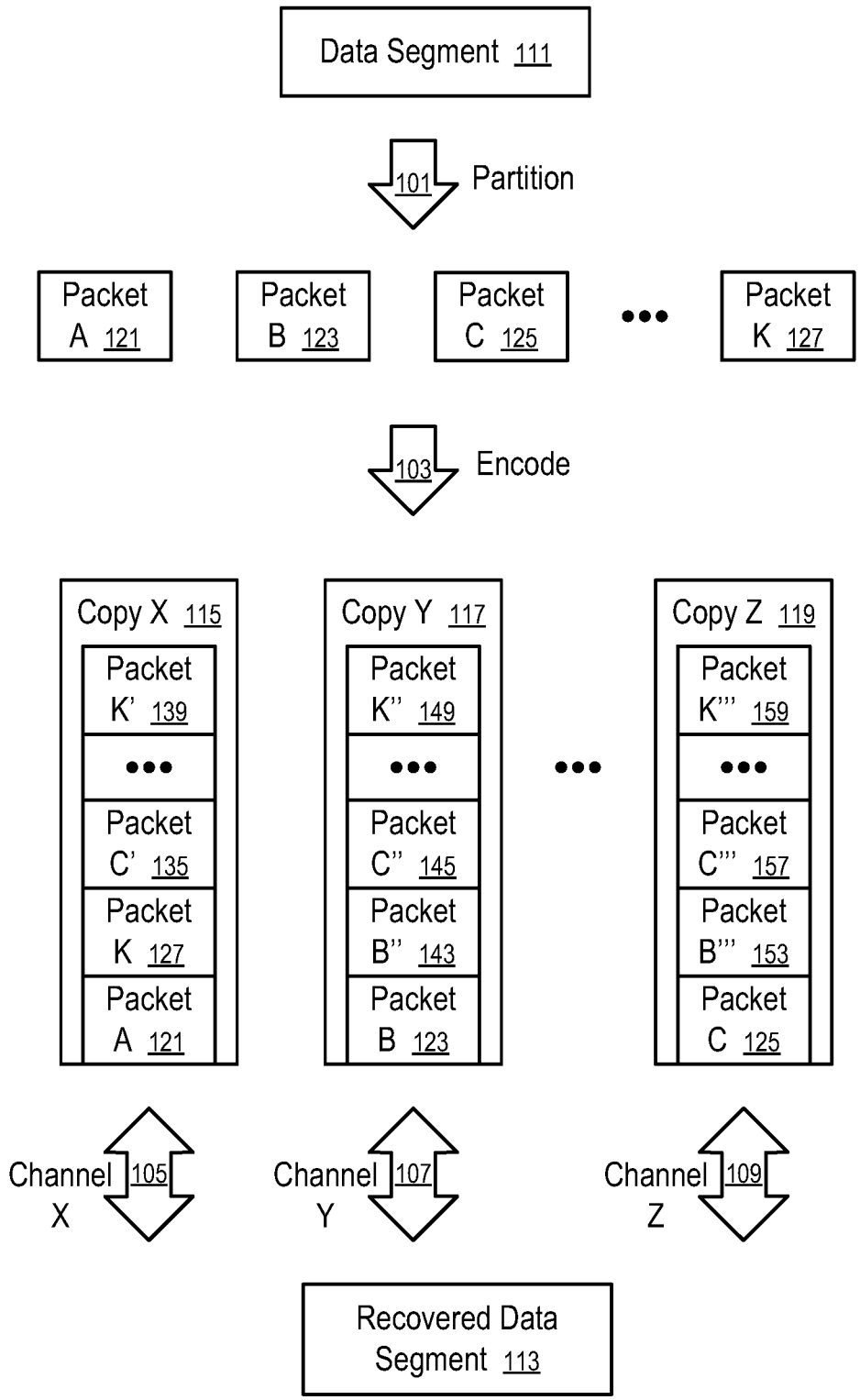
FIG. 2 shows a technique to transmit a data segment via FEC over multiple parallel channels using an initial systematic phase according to one embodiment.

The system of FIG. 1 can be further improved by distributing the original packets as initial packets (or leading packets) in the copies (115, 117, . . . , 119) that are transmitted prior to the transmission of channel-encoded packets (or non-systematic) of the respective copies (115, 117, . . . , 119), as illustrated in FIG. 2.

Alternatively or in combination, the system of FIG. 1 can be further improved by rejecting, in the random selection of the original packets for channel-encoding using the forward error correction technique, channel-encoded packets that do not, or are not likely to, contribute to the recovered data segment (113), in view of a base set of packets that have been, or likely, received by the recipient device before the transmission of such packets. Thus, data redundancy is reduced without impacting the performance of forward error correction, as illustrated in FIG. 3.

Figure 3:
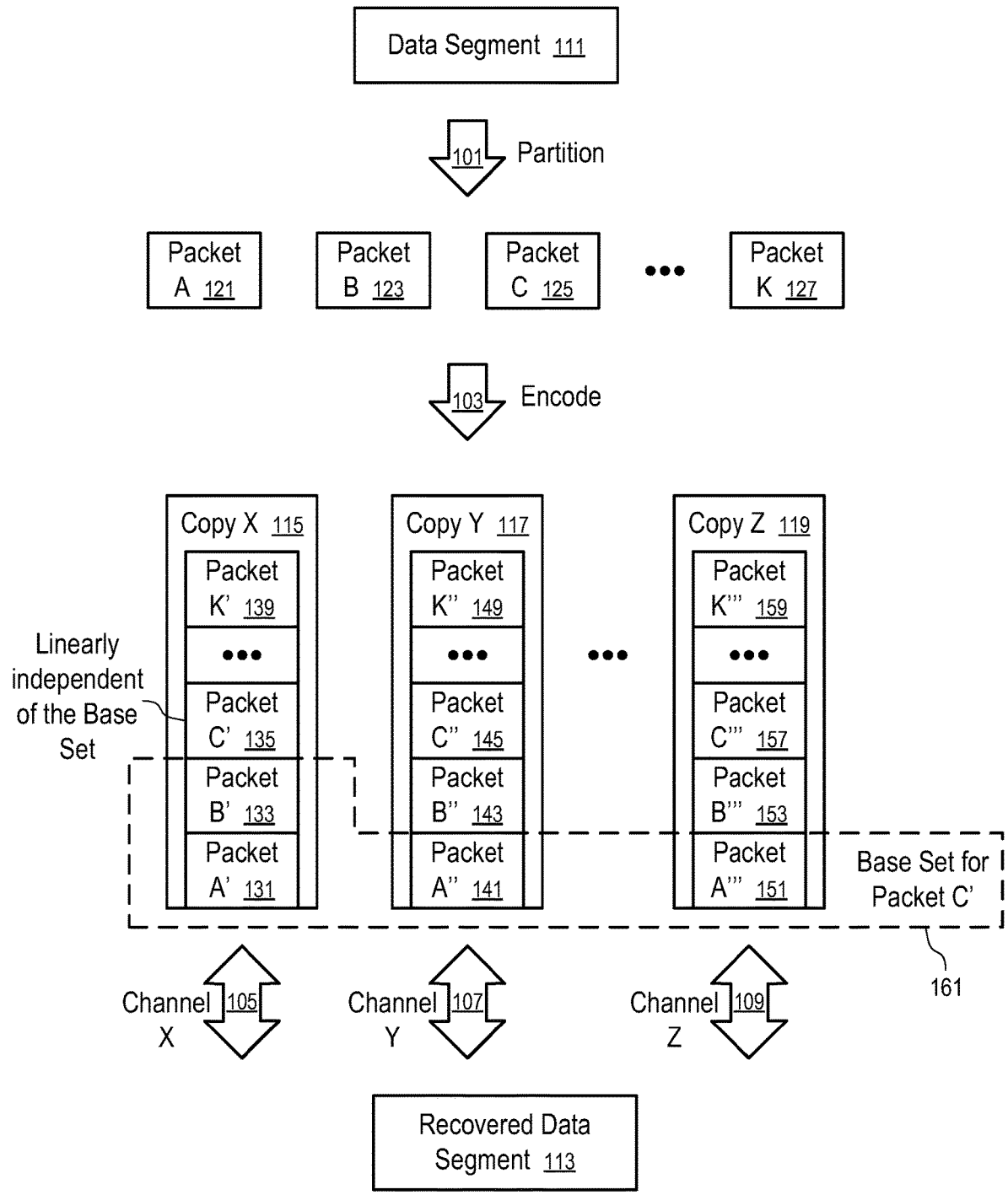
FIG. 3 shows a technique to transmit a data segment via FEC over multiple parallel channels using encoded packets that are linearly independent of their base sets according to one embodiment.

In general, the techniques of FIG. 2 and FIG. 3 can be combined.

Further, for a given number of the original packets (121, 123, 125, . . . , 127) and a given number of the channels (e.g., 105, 107, . . . , 109), the system can predetermine the composition of the channel-encoded packets (131, 133, 135, . . . , 139; 141, 143, 145, . . . , 149; . . . ; 151, 153, 157, . . . , 159). The composition of a channel-encoded packet (131, 133, 135, . . . , 139; 141, 143, 145, . . . , 149; . . . ; 151, 153, 157, . . . , or 159) identifies the identity/identities of the subset of the original packets (121, 123, 125, . . . , 127) used to generate the channel-encoded packet. For example, each of the original packets (121, 123, 125, . . . , 127) can be identified based on its sequence/position number in the sequence of the original packets (121, 123, 125, . . . , 127) (or another type of identification symbol) without its actual data of the original packet. The compositions of the channel-encoded packets (131, 133, 135, . . . , 139; 141, 143, 145, . . . , 149; . . . ; 151, 153, 157, . . . , 159) for the encoded copies (115, 117, . . . , 119) can be stored without the actual data of the original packets. When the actual data of the original packets (121, 123, 125, . . . , 127) is available, the compositions of the channel-encoded packets (131, 133, 135, . . . , 139; 141, 143, 145, . . . , 149; . . . ; 151, 153, 157, . . . , 159) are retrieved to combine the respective original packets (121, 123, 125, . . . , 127) identified by the compositions to generate the respective channel-encoded packets (131, 133, 135, . . . , 139; 141, 143, 145, . . . , 149; . . . ; 151, 153, 157, . . . , 159).

For example, at the time of the transmission, a transmitter receives the set of original packets (121, 123, 125, . . . , 127) and the sequence of compositions for the scheduled sequence of channel-encoded packets (e.g., 131, 133, 135, . . . , 139; 141, 143, 145, . . . , 149; . . . ; or 151, 153, 157, . . . , 159). The transmitter combines the original packets (121, 123, 125, . . . , 127) according to the compositions to generate the respective channel-encoded packets just before transmitting the generated packets for transmission over the respective channel (e.g., 105, 107, . . . , or 109). Thus, when the recipient device signals for the early termination of the transmission, the remaining channel-encoded packets do not have to be actually generated and/or stored.

FIG. 2 shows a technique to transmit a data segment via FEC over multiple parallel channels using an initial systematic phase according to one embodiment. For example, the technique of FIG. 2 can be used in a system illustrated in FIG. 1.

In FIG. 2, each copy (e.g., 115, 117, . . . , or 119) scheduled to be transmitted via a respective channel (e.g., 105, 107, . . . , 109) has a sequence of scheduled packets (121, 127, 135, . . . , 139; 123, 143, 145, . . . , 149; . . . ; or 125, 153, 157, . . . , 159). The copies (115, 117, . . . , 119) have a set of initial packets (121, 123, . . . , 125, 127) that correspond to the set of original packets (121, 123, 125, . . . , 127).

In each of the channels (105, 107, . . . , 109), the initial packets of a respective copy (e.g., 115, 117, . . . , 119) are transmitted before other packets of the respective copy (e.g., 115, 117, . . . , 119). For example, the initial packets (121, 127) of Copy X (115) are transmitted before the transmission of packets (135, . . . , 139) of Copy X (115); the initial packet (123) of Copy Y (117) is transmitted before the transmission of packets (143, 145, . . . , 149) of Copy Y (117); and the initial packet (125) of Copy Z (119) is transmitted before the transmission of packets (153, 155, . . . , 159) of Copy Z (119).

The initial packets (121, 123, . . . , 125, 127) are generated/identified by distributing the set of original packets (121, 123, 125, . . . , 127) to the copies (115, 117, . . . , 119).

For example, when the channels (105, 107, . . . , 109) have the same nominal/average/expected transmission speed, the original packets (121, 123, 125, . . . , 127) can be distributed to the copies (115, 117, . . . , 119) substantially evenly. For example, the original packets (121, 123, 125, . . . , 127) can be distributed one at a time to the copies according to a round-robin scheme until all of the original packets (121, 123, 125, . . . , 127) are distributed to the copies (115, 117, . . . , 119). Alternatively, the system computes the average number of original packets (e.g., by dividing the number of packets by the number of channels and taking the integer part of the result), assigns the average number of original packets to each copy, and randomly distribute the remaining, unassigned packets one at a time to the copies (115, 117, . . . , 119) until all of the original packets (121, 123, 125, . . . , 127) are assigned.

In instances where the channels (105, 107, . . . , 109) have substantially different nominal/average/expected transmission speeds, the original packets (121, 123, 125, . . . , 127) can be distributed to the copies (115, 117, . . . , 119) in a ratio approximately equal to the ratio of their nominal/average/expected transmission speeds.

Once all original packets have been distributed as the initial packets of the copies (e.g., 115, 117, . . . , 119), channel-encoded packets (e.g., 135, 143, 145, . . . , 149, 153, 157, . . . , 159) are generated and added to the copies (e.g., 115, 117, . . . , 119). Each channel-encoded packet (e.g., 135) of a given copy (e.g., 115) can be generated from a linear combination of a random selected subset of all the original packets (e.g., 121, 123, 125, . . . , 127).

Preferably, each channel-encoded packet (e.g., 135) of a given copy (e.g., 115) can be generated from a linear combination of a random selected subset of the original packets (e.g., 123, 125) carried by other copies (e.g., 117, . . . , 119) another than the given copy (e.g., 115). In other words, the set of original packets (e.g., 121, 127) carried by the given copy (e.g., 115) is not used for the generation of the channel-encoded packets (e.g., 135, . . . , 139) of this given copy (e.g., 115). This is because by the time a channel-encoded packet (e.g., 135) of this given copy (e.g., 115) is received, the recipient device will already have received all the original packets (e.g., 121, 127) carried by this given copy (e.g., 115). Excluding these original packets will reduce both computational complexity and the probability of generating useless channel-encoded packets.

FIG. 3 shows a technique to transmit a data segment via FEC over multiple parallel channels using channel-encoded packets that are linearly independent of their base sets according to one embodiment. For example, the technique of FIG. 3 can be used in a system illustrated in FIGS. 1 and/or 2.

In FIG. 3, the transmission of data packets within each channel (105, 107, . . . , 109) is reliable. Thus, at the time of the transmission of a subsequent packet (e.g., 135) in the channel (e.g., 105), the recipient device has correctly received the data packets (e.g., 131, 133) that have been transmitted in the same channel (e.g., 105) before the subsequent packet (e.g., 135). Thus, a candidate for the subsequent channel-encoded packet (e.g., 135) that is linearly dependent of the received data packets (e.g., 131, 133) is useless and can be rejected.

Further, by the time of the transmission of the subsequent packet (e.g., 135) in the channel (e.g., 105), it is very likely that the recipient device has received the initial packets (e.g., 141, . . . , 151) transmitted in other channels (e.g., 107, . . . , 109). The subsequent packet (e.g., 135) can be considered to have a base set (161) of packets (131, 133, 141, . . . , 151) that include all the packets (e.g., 131, 133) in the same channel (e.g., 105) that are scheduled to be transmitted before the subsequent packet (e.g., 135) and the initial packets (e.g., 141, . . . , 151) of the other channels (e.g., 107, . . . , 109) that are very likely to have reached the recipient device via other channels (e.g., 107, . . . , 109) before the transmission of the subsequent packet (e.g., 135). A candidate for the subsequent packet (e.g., 135) that is linearly dependent of the base set is most likely useless and thus can be rejected.

To ensure/improve the usefulness of the channel-encoded packet (135), the system of FIG. 3 is configured to identify the subsequent channel-encoded packet (135) such that it is linearly independent of the base set (161) of packets (131, 133, 141, . . . , 151), where the base set (161) includes all the packets (e.g., 131, 133) that are scheduled in the copy (115) before the subsequent channel-encoded packet (135), and the certain initial packets (e.g., 141, . . . , 151) of the other copies (117, . . . , 119).

In determining the initial packets (e.g., 141, . . . , 151) of the other copies (117, . . . , 119) for the base set (161) for the subsequent packet (135), it is assumed that the base set (161) is insufficient to generate the recovered data segment (113), which triggers the need to transmit the subsequent packet (135) in the channel (105). Thus, the base set (161) is identified to include less packets than the entire set of the original packets (121, 123, 125, . . . , 127).

Further, the other channels (e.g., 107, . . . , 109) are assumed to have transmitted their initial packets according to their ratio of the nominal/average/expected transmission speeds. For example, when the other channels (e.g., 107, . . . , 109) have an equal nominal/average/expected transmission speed, the same number of initial packets are selected from the other copies (e.g., 117, . . . , 119) for the base set (161) of the subsequent packet (135).

For example, the initial packets (e.g., 141, . . . , 151) of the other copies (117, . . . , 119) can be selected for the base set (161) of the subsequent packet (135) of the copy (115) in the follow manner. The system determines a remaining number of packets to be transmitted in the other copies (117, . . . , 119) by reducing the number of original packets (121, 123, 125, . . . , 127) by the number of initial packets in the copy (115) up to and including the subsequent packet (135). The system then distributes the remaining number of packets to the other copies (117, . . . , 119) (e.g., according to their ratio of nominal/average/expected transmission speeds). The numbers of packets distributed to the other copies (117, . . . , 119) identifies the corresponding numbers of initial packets (e.g., 141, . . . , 151) of the other copies (117, . . . , 119) that are included in the base set (161) for the subsequent packet (135) of the copy (115).

For example, there are K original packets (121, 123, 125, . . . , 127); the subsequent packet (135) is the k'th packet in the copy (115); and the system uses M channels (105, 107, . . . , 109) to transmit the M copies (115, 117, . . . , 119) respectively in parallel. The remaining number of packets to be distributed to the other copies (117, . . . , 119) is (K−k). When the other channels (107, . . . , 109) have the same nominal/average/expected transmission speed, the other copies (e.g., 117, . . . , 119) have an average of (K−k)/(M−1) initial packets of their respective copies (117, . . . , 119) that are selected as the base set (161) for the subsequent packet (135). When (K−k)/(M−1) is not an integer, and d is the integer that is closest to (K−k)/(M−1) but no larger than (K−k)/(M−1), the base set (161) may be selected to include the initial d packets of each of the other copies (e.g., 117, . . . , 119). Optionally, the base set (161) may further include an additional initial packet from (K−k)−d*(M−1) randomly selected copies of the other copies (e.g., 117, . . . , 119).

Further, when the channels (105, 107, . . . , 109) have the same nominal/average/expected transmission speed, the number of initial packets selected from each other copies (e.g., 117, . . . , 119) is not more than k−1, since at the time of the transmission of the k'th packet in channel (105), no more than k−1 packets of each other copies (e.g., 117, . . . , 119) are expected to have been transmitted through each other channels (107, . . . , 109).

The compositions of the channel-encoded packets can be used to identify whether or not a candidate for the subsequent packet (135) is linearly dependent of the base set (161). The composition of a channel-encoded packet (e.g., 135) identifies a subset of the original packets (121, 123, 125, . . . , 127) that are used in the generation of the channel-encoded packet (e.g., 135). More specifically, the composition of the channel-encoded packet (e.g., 135) identifies which of the original packets (121, 123, 125, . . . , 127) are used in the generation of the channel-encoded packet (e.g., 135) and which are not. For example, the composition of a channel-encoded packet can be represented by a vector of symbols, where the i'th symbol of vector is either zero when the i'th original packet is not used in the generation of the channel-encoded packet, or one when the i'th original packet is used in the generation of the channel-encoded packet.

The subsequent packet (135) can be selected such that the composition vector of the subsequent packet (135) is linearly independent of the composition vectors of the packets (131, 133, 141, . . . , 151) in the base set (161). For example, when a forward error correction technique is used to select a random subset of the original packets (121, 123, 125, . . . , 127) for the generation of the subsequent packet (135), the system checks whether the random subset has a composition that is linearly independent of the compositions of the packets in the base set (161); if so, the random subset is accepted as the composition of the subsequent packet (135); otherwise, the random subset is rejected, and another random subset is selected.

Since each subsequent packet (e.g., 135) scheduled in a copy (e.g., 115) is at least linearly independent of the packets scheduled before the subsequent packet in the same copy (e.g., 115), the copy (e.g., 115) requires at most the same count of packets (e.g., 131, 133, 135, . . . , 139) as the original packets (121, 123, 125, . . . , 127).

Figure 4:
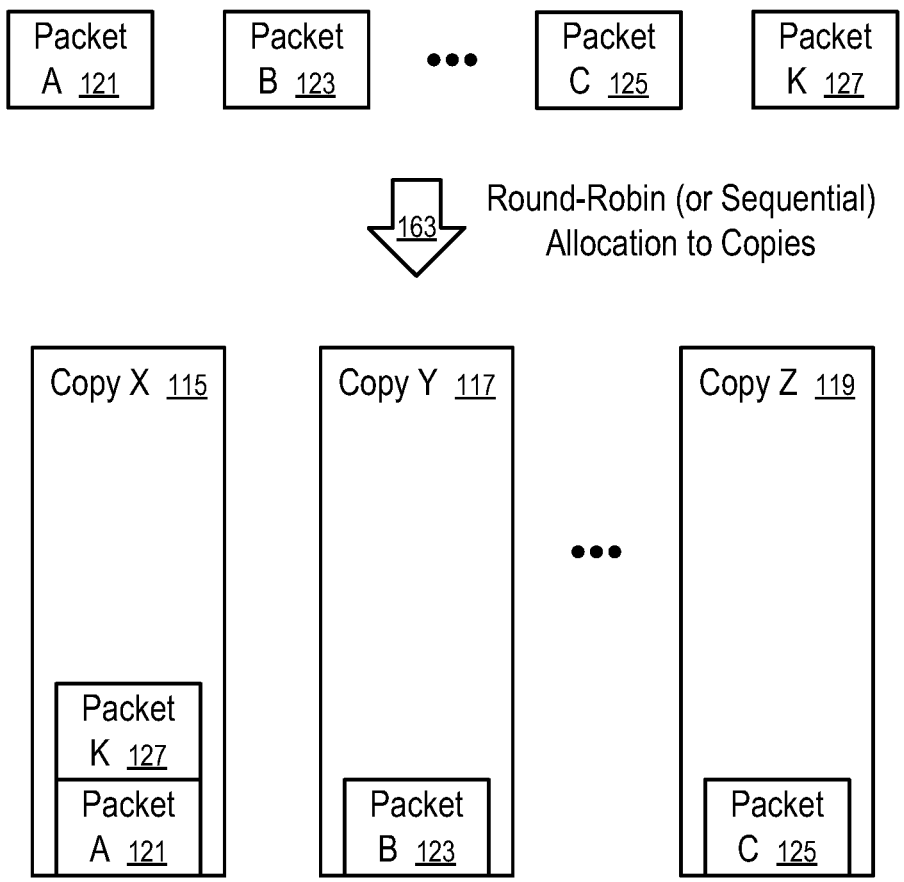
FIG. 4 shows scheduling of systematic packets over multiple parallel channels according to one embodiment.

FIG. 4 shows scheduling of systematic packets over multiple parallel channels according to one embodiment. For example, the scheduling technique of FIG. 4 can be used in the system of FIG. 2.

In FIG. 4, the initial packets (121, 123, . . . , 125, 127) of the copies (115, 117, . . . , 119) are generated by round-robin allocation (163) of the original set of packets (121, 123, . . . , 125, 127) to the copies (115, 117, . . . , 119). As discussed above, the round-robin allocation (163) can be performed according to the ratio of the nominal/average/expected transmission speeds of channels used to transmit the copies (115, 117, . . . , 119) in parallel.

The round-robin allocation (163) can be performed without the actual data of the original packets (121, 123, . . . , 125, 127). The compositions of the initial systematic packets (121, 123, . . . , 125, 127) identify the respective original packets (121, 123, . . . , 125, 127) that are literally copied into the respective initial systematic packets (121, 123, . . . , 125, 127).

Figure 5:
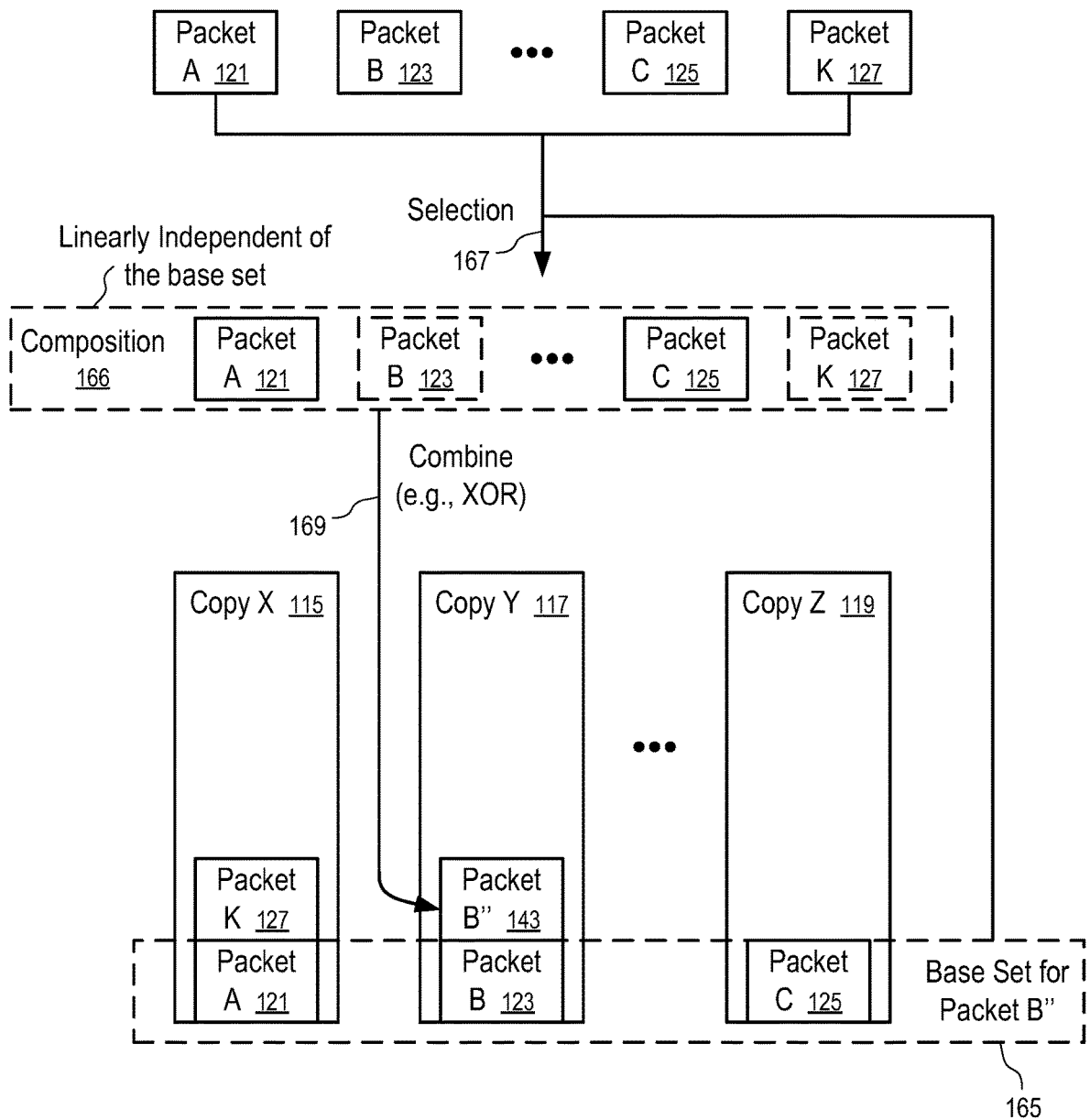
FIG. 5 shows the identification of the composition of a channel-encoded packet according to one embodiment.

Subsequent channel-encoded packets for the copies (115, 117, . . . , 119) can be generated using any forward error correction technique in general and more preferably, in a way as illustrated in FIG. 3 or FIG. 5.

FIG. 5 shows the identification of the composition (166) of a channel-encoded packet (143) according to one embodiment. For example, the scheduling technique of FIG. 5 can be used in combination the techniques of FIG. 3 or FIG. 4. Although FIG. 5 illustrates an example where a set of the initial packets of the copies (115, 117, . . . , 119) are original packets, the method of FIG. 5 can also be applied to the use of channel-encoded initial packets in the copies (115, 117, . . . , 119).

In FIG. 5, a base set (165) is identified for the packet (143) scheduled to be transmitted after the packet (123) in the copy (117). The base set (165) is insufficient to reconstruct the entire set of the original packets (121, 123, . . . , 125, 127); and the base set (165) includes packets that are expected (or most likely) to have been received in a recipient device at the time the packet (143) is to be transmitted if the copies (115, 117, . . . , 119) are transmitted in parallel using multiple channels (e.g., 105, 107, . . . , 109). Examples of methods to identify the base set (165) are discussed above in connection with FIG. 3.

In FIG. 5, the compositions of the packets in the base set (165) are used to identify the composition (166) of the channel-encoded packet (143). Specifically, the composition (166) is generated by randomly selecting (167) a subset from the original packets (121, 123, . . . , 125, 127) (e.g., according to a distribution function of a forward error correction technique). In FIG. 5, solid boxed packets (e.g., 121, . . . , 125) in the composition (166) are illustrated as the packets of the subset that is selected for the generation of the channel-encoded packet (143); and the dash boxed packets (e.g., 123, . . . , 127) in the composition (166) are illustrated as the packets not selected for the generation of the channel-encoded packet (143). In FIG. 5, the random selection of the subset is repeated (e.g., according to the predetermined distribution function) until the composition vector of the selected subset is linearly independent of the composition vectors of the packets (e.g., 121, 123, . . . , 125) in the base set (165). The selected composition (166) of the channel-encoded packet (143) ensures that the packet (143) is useful, and thus not redundant, when it is used in combination with the packets (121, 123, . . . , 125) in base set (165) during channel decoding. Since at least some useless packets are pre-filtered during the selection of the compositions of the subsequent channel-encoded packets, the technique improved the efficiency in the use of the network channels during the transmission of the channel-encoded copies (115, 117, . . . , 119).

Further, to reduce computational complexity the composition (166) can be selected such that the packets (e.g., 121, . . . , 125) selected in the composition (166) to compute the channel-encoded packet (143) of the copy (117) do not include the original packets (e.g., 123) that are scheduled to be transmitted in the copy (117) before the channel-encoded packet (143) and/or do not include the original packets (121, 123, . . . , 125) in the base set (165). For example, the random selection of packets for the composition (166) may be limit to the subset of original packets that do not include the leading original packets (e.g., 123) of the copy (117) and/or the original packets (121, 123, . . . , 125) in the base set (165) to reduce both computational complexity in channel-encoding and the probability of generating a composition that is linearly dependent of the base set (165).

The composition (166) can be stored as an intermediate result such that at a later time when the actual packet (143) is to be used (e.g., for transmission over a communication channel), the composition (166) can be used to select original packets that are combined (169) (e.g., via exclusive or (XOR) or another linear combination function) to generate the content of the channel-encoded packet (143).

Since the scheduling of the subsequent packet (143) does not require the actual data/content of the original packets (121, 123, ..., 125, 127), the selection (167) of original packets (121, 123, ..., 125, 127) for further subsequent packets can be performed in a similar way based on the stored compositions of the packets that have already scheduled in the copies (115, 117, ..., 119). Thus, the compositions of all of the packets in the copies (115, 117, ..., 119) can be pre-computed and stored for the predetermined number of original packets (121, 123, ..., 125, 127) without the actual packet data/content. This allows the scheduling of the packets before transmission and before the content of the packets (121, 123, ..., 125, 127) becomes available. At the time of transmission, a transmitter retrieves the compositions of the packets scheduled in the respective copy (e.g., 117) and combines the original packets according to the compositions (e.g., 166) to generate the packet (e.g., 143) just in time for its transmission.

Figure 6:
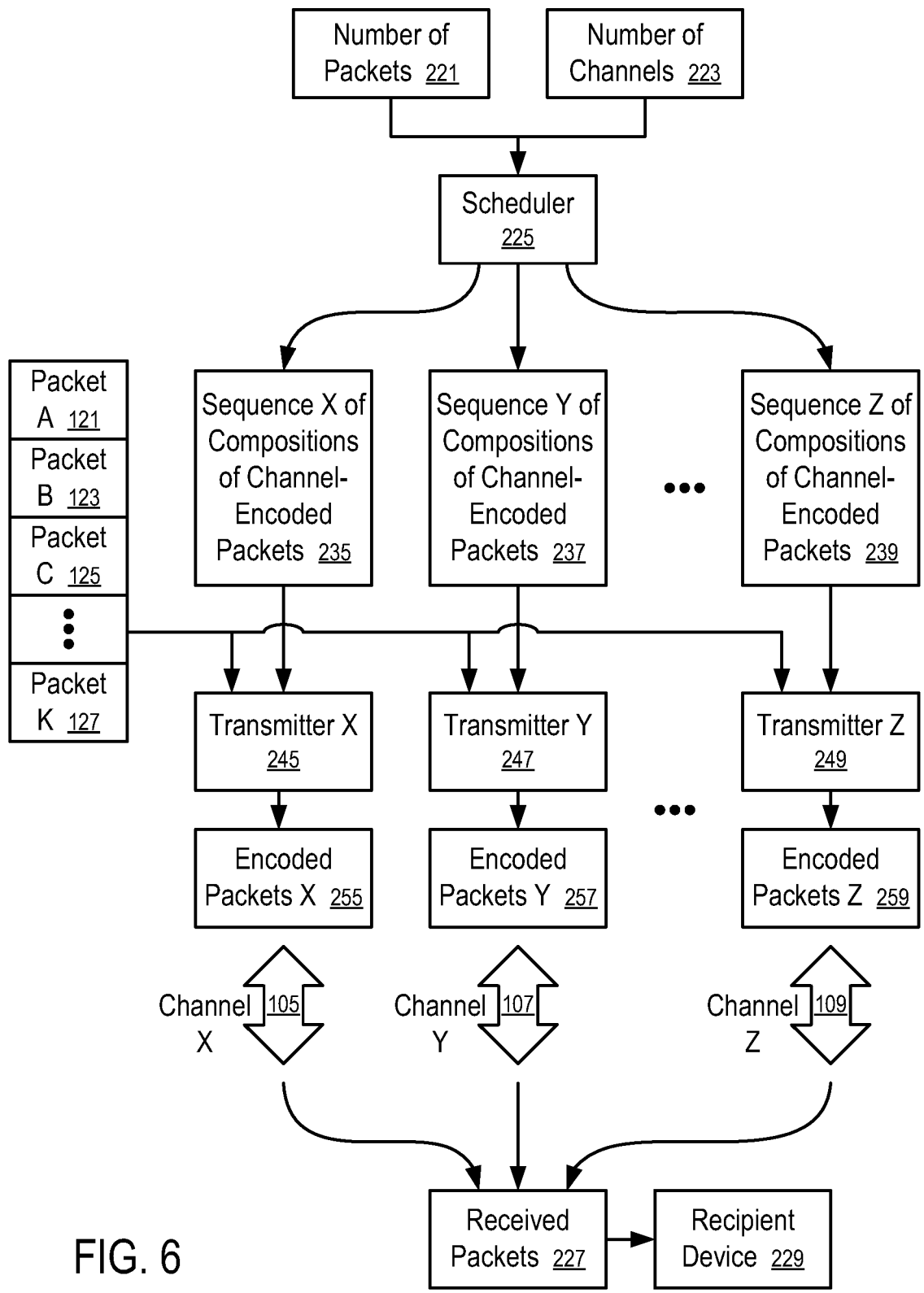
FIG. 6 shows a system to transmit data packets using multiple channels according to one embodiment.

FIG. 6 shows a system to transmit data packets using multiple channels according to one embodiment. For example, the system of FIG. 6 can be implemented to use techniques of FIGS. 1, 2 and/or 3.

In FIG. 6, a scheduler (225) computes the sequences (235, 237, ..., 239) of compositions of channel-encoded packets (e.g., 255, 257, ..., 259) based on the number (221) of the original packets (121, 123, 125, ..., 127) from which the channel-encoded packets (e.g., 255, 257, ..., 259) are generated and the number (223) of the channels (105, 107, ..., 109) that will be used for the transmissions of the channel-encoded packets (e.g., 255, 257, ..., 259).

For example, the compositions of initial channel-encoded packets of the sequences (235, 237, ..., 239) can be determined using a method of FIG. 4; and compositions of subsequent channel-encoded packets of the sequences (235, 237, ..., 239) can be determined using a method of FIG. 5.

Alternatively, the compositions of at least some of the initial channel-encoded packets of the sequences (235, 237, ..., 239) and/or the subsequent channel-encoded packets of the sequences (235, 237, ..., 239) can be determined based on a random process without using the methods of FIG. 4 and/or FIG. 5.

In FIG. 6, the sequences (235, 237, ..., 239) of compositions are provided to the transmitters (245, 247, ..., 249) that are coupled with the respective channels (105, 107, ..., 109) for the transmission of the respective channel-encoded packets (255, 257, ..., 259). The transmitters (245, 247, ..., 249) receive the same copy of the original packets (121, 123, 125, ..., 127). Using the respective sequences (235, 237, ..., 239) of compositions, the transmitters (245, 247, ..., 249) apply a predetermined function (e.g., XOR) to original packets identified in the respective compositions to generate the sequences of channel-encoded packets (255, 257, ..., 259) for transmission to the recipient device (229).

Preferably, each of the transmitters (245, 247, ..., 249) generates a subsequent channel-encoded packet for a sequence (e.g., 235, 237, ..., or 239) after the channel-encoded packets scheduled before the subsequent channel-encoded packet in the sequence have been successfully transmitted through the respective channel (e.g., 105, 107, ..., 109).

Alternatively, channel-encoded packets (e.g., 255, 257, ..., 259) may be pre-generated before the transmission. For example, the scheduler (225) may generate the sequences of the channel-encoded packets (e.g., 255, 257, ..., 259) and provide the channel-encoded packets (e.g., 255, 257, ..., 259) directly to the transmitters (e.g., 245, 247, ..., 249), instead of providing the combination of the original packets (121, 123, 125, ..., 127) and the sequences (235, 237, ..., 239) of compositions of the channel-encoded packets (255, 257, ..., 259). In some instances, some of the transmitters (e.g., 247) are configured to receive the sequence channel-encoded packets (e.g., 257), while other transmitters (e.g., 245) are configured to receive the sequences (e.g., 235) of compositions and the original packets (e.g., 121, 123, 125, ..., 127) to generate the channel-encoded packets (e.g., 255) on-the-fly during their transmission.

In FIG. 6, the transmitters (245, 247, ..., 249) use the channels (105, 107, ..., 109) to transmit the channel-encoded packets (255, 257, ..., 259) in parallel. However, due to the real-time performance variations, the sequence of the received packets (227) obtained by the recipient device (229) from the channels (105, 107, ..., 109) may be partially randomized. When the recipient device (229) receives a sufficient number of channel-encoded packets via any combination of the channels (105, 107, ..., 109), the recipient device (229) can fully recover the sequence of original packets (121, 123, 125, ..., 127) using the forward error correction technique for channel decoding.

The system of FIG. 6 allows the transmitters (245, 247, ..., 249) to transmit their respective sequences of encoded packets (255, 257, ..., 259) without coordination with each other. The sequences (e.g., 235, 237, ..., 239) of the encoded packets (e.g., 255, 257, ..., 259) are predetermined and are not changed during the transmission. Thus, there is no need for reverse communications from the recipient device (229) to the transmitters (245, 247, ..., 249) and/or the scheduler (225) for the coordination of the generation of the channel-encoded packets across the channels (105, 107, ..., 109).

Optionally, the recipient device (229) individually requests at least some of the transmitters (245, 247, ..., 249) to terminate their transmissions, after the set of received packets (227) is sufficient to recover the original sequence of the original packets (121, 123, 125, ..., 127) and before the respective transmitters (245, 247, ..., 249) complete the transmission of their complete sequences (235, 237, ..., 239) of encoded packets.

The recipient device may deliver any received original packets to an application (e.g., a video player) in order, determine whether any of the received channel-encoded packet is useful, and if enough useful packets have been received, it causes the termination of the transmission across the parallel channels (105, 107, ..., 109), and applies FEC decoding to recover all of the original packets (121, 123, 125, ..., 127).

Figure 7:
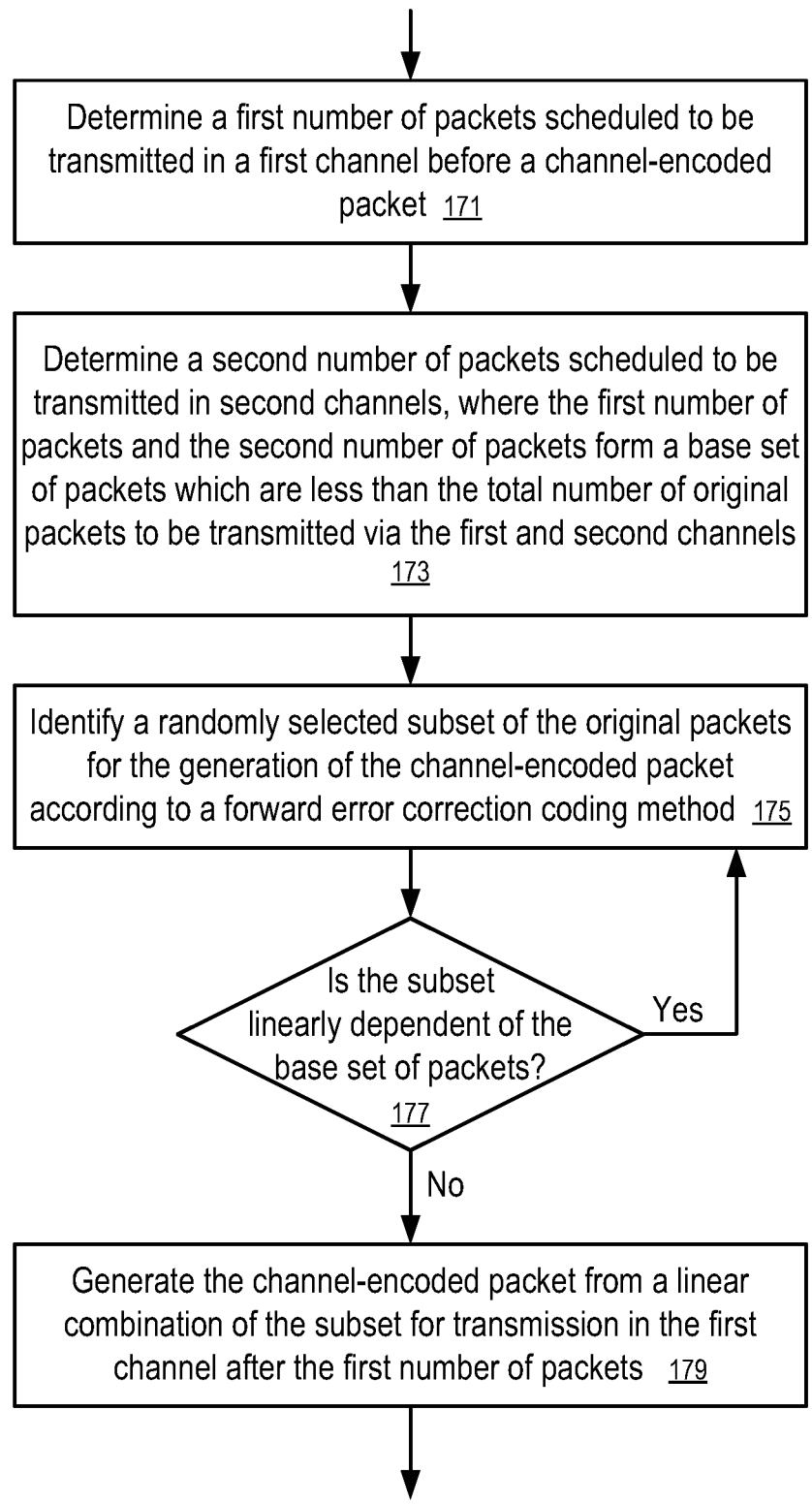
FIG. 7 shows a method to generate a channel-encoded packet according to one embodiment.

FIG. 7 shows a method to generate a channel-encoded packet according to one embodiment. For example, the method of FIG. 7 can be used by the scheduler (225) of FIG. 6 in the determination/selection (167) of the composition (166) of a packet (143) illustrated in FIG. 5, or the generation of the subsequent packet (135) illustrated in FIG. 3.

In FIG. 7, the scheduler (225) is configured to: determine (171) a first number of packets (e.g., 131, 133) scheduled to be transmitted in a first channel (e.g., 105) before a channel-encoded packet (135); and determine (173) a second number of packets (e.g., 141, ..., 151) scheduled to be transmitted in second channels (e.g., 107, ..., 109). The first number of packets (e.g., 131, 133) and the second number of packets (e.g., 141, ..., 151) form a base set (161), where the packets (e.g., 131, 133, 141, ..., 151) in the base set (161) are less than the total number of original packets (e.g., 121, 123, 125, . . . , 127) to be transmitted via the first and second channels (e.g., 105, 107, . . . , 109).

The scheduler (225) identifies (175) a randomly selected subset of the original packets (121, 123, . . . , 127) for the generation of the encoded packet (e.g., 135) according to a forward error correction coding method. If it is determined (177) that the subset is linearly dependent of the base set (161) (e.g., based on their composition vectors), the subset is rejected; and the computing device identifies (175) another randomly selected subset, until it is determined (177) that the subset is linearly independent of the packets (e.g., 131, 133, 141, . . . , 151) in the base set (161). The identification of the subset provides the composition of the encoded packet (e.g., 135) scheduled to be transmitted after the first number of packets (e.g., 131, 133) in the first channel (e.g., 105).

In FIG. 7, the scheduler (225) (or the transmitters (245, 247, . . . , 249), or another device) generates (179) the encoded packet (135) from a linear combination (e.g., XOR) of the subset for transmission in the first channel (105) after the first number of packets (e.g., 131, 133).

Figure 8:
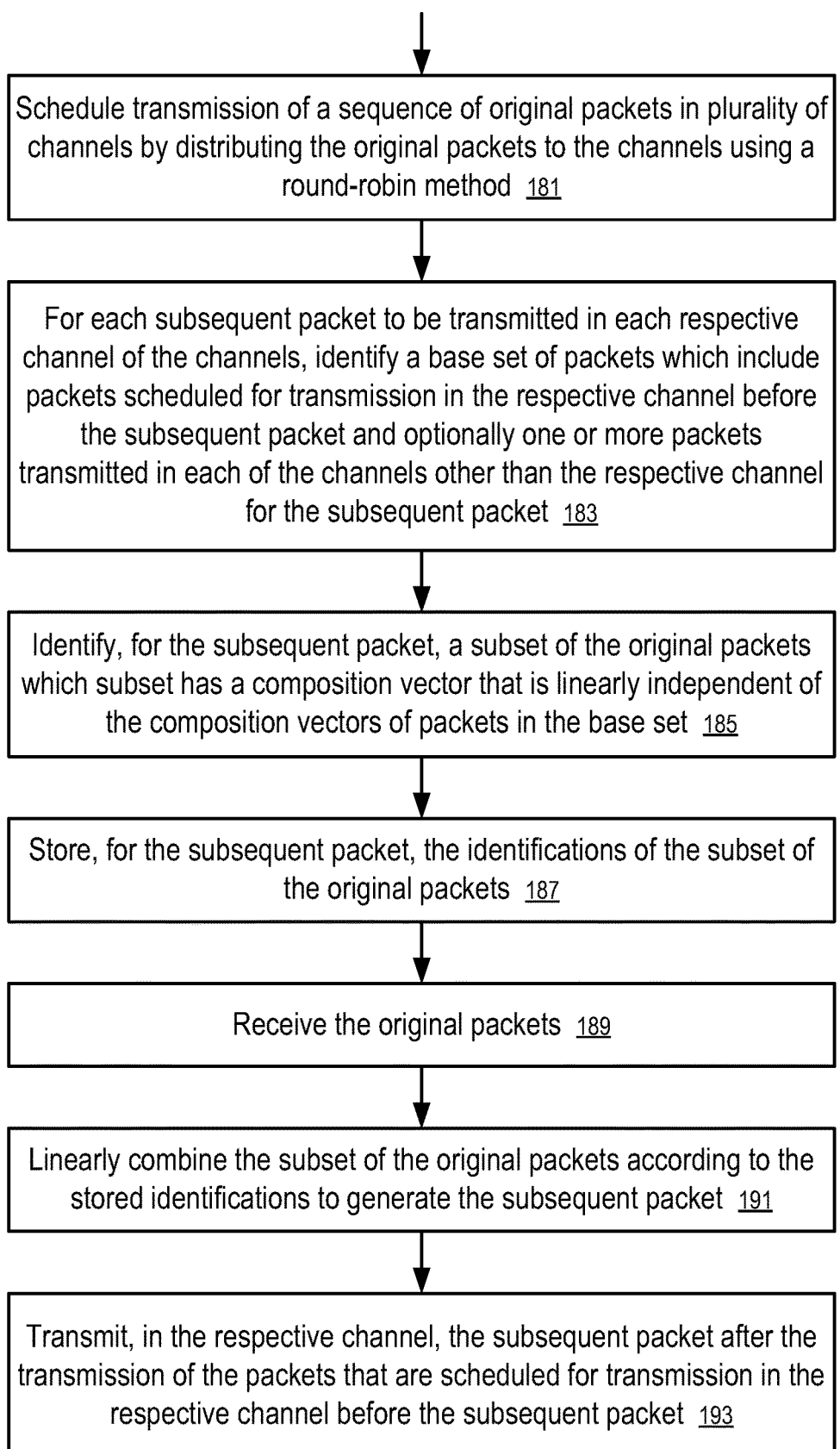
FIG. 8 shows a method to transmit a data segment according to one embodiment.

FIG. 8 shows a method to transmit a data segment according to one embodiment. For example, the method of FIG. 8 can be implemented in a system illustrated in FIG. 6.

In FIG. 8, a scheduler (225) is configured to schedule (181) the transmission of a sequence of original packets (121, 123, . . . , 125, 127) in the plurality of channels (105, 107, . . . , 109) by distributing the original packets (121, 123, . . . , 125, 127) to the channels using a round-robin method (163). Preferably, the original packets (121, 123, . . . , 125, 127) distributed to the plurality of channels (105, 107, . . . , 109) function as the systematic channel-encoded packets scheduled to be transmitted in the respective channels before the transmission of other subsequent non-systematic channel-encoded packets.

In FIG. 8, for each subsequent packet (e.g., 135) to be transmitted in each respective channel (e.g., 105) of the channels, the scheduler (225) identifies a base set (e.g., 161) of packets (e.g., 131, 133, 141, . . . , 151), which may include all packets (e.g., 131, 133) that are scheduled for transmission in the respective channel (e.g., 105) before the subsequent packet (e.g., 135) and optionally one or more packets (e.g., 141, . . . , 151) scheduled for parallel transmission in each of the channels (e.g., 107, . . . , 109) other than the respective channel (e.g., 105) for the subsequent packet (e.g., 135).

In FIG. 8, the scheduler (225) identifies (185), for the subsequent packet (e.g., 135), a subset of the original packets (e.g., 123, . . . , 125, 127 as identified by the composition (166) of a subsequent packet (e.g., 143) in FIG. 5), such that the composition vector of the subset is linearly independent of the composition vectors of the packets in the base set. The subset can be randomly selected according to a forward error correction technique until the subset has a composition that is linearly independent of the compositions of the packets in the base set.

In FIG. 8, the scheduler (225) stores (187), for the subsequent packet (e.g., 135), the identifications of the subset of the original packets as the composition of the subsequent packet (e.g., 135).

After the original packets (121, 123, 125, . . . , 127) are received (189), the scheduler (225) (or a transmitter (e.g., 245), or another device) linearly combines (191) the subset of the original packets according to the stored identifications, or the stored composition of the subsequent packet (e.g., 135), to generate the subsequent packet (e.g., 135).

A transmitter (e.g., 245) transmits (193), in the respective channel (e.g., 105), the subsequent packet (e.g., 135) after the transmission of the packets (e.g., 131, 133) that are scheduled for transmission in the respective channel (e.g., 105) before the subsequent packet (e.g., 135).

In one aspect, a method implemented in a computing apparatus includes: generating, by the computing apparatus, a plurality of first data packets (121, 123, 125, . . . , 127) of a same length from a data segment (111) to be transmitted via a plurality of parallel communication channels (105, 107, . . . , 109); and identifying, by the computing apparatus (e.g., using the scheduler (225)) from the first data packets (121, 123, 125, . . . , 127), a plurality of packet sequences (115, 117, . . . , 119) for the plurality of parallel communication channels (105, 107, . . . , 109) respectively. Each respective sequence (e.g., 115) of the plurality of packet sequences includes: one or a plurality of initial packets (e.g., 131) that are original packets (121, 123, 125, . . . , 127) and that are scheduled to be transmitted before subsequent packets (e.g., 133, 135, . . . , 139) in the respective sequence (e.g., 115); and subsequent packets (e.g., 135) that are linear combinations of a subset of the original packets (e.g., 121, 123, . . . , 127). The method further includes transmitting, by the computing apparatus (e.g., using the transmitters (245, 247, . . . , 249)), the plurality of sequences (115, 117, . . . , 119) of packets in the plurality of parallel communication channels (105, 107, . . . , 109) respectively.

During the transmitting, a recipient device (229) coupled to the plurality of parallel communication channels (105, 107, . . . , 109) is configured to determine whether a received set of packets (227), received via the parallel communication channels (105, 107, . . . , 109), is sufficient to reconstruct the data segment (111). In response to a determination that the received set of packets (227) is sufficient to reconstruct the data segment (111), the recipient device (229) directly terminates the transmitting of the sequences of channel-encoded packets. Alternatively, the recipient device (229) transmits an indicator to the computing apparatus to stop the transmitting of the sequences of channel-encoded packets.

In one embodiment of the aspect, the subsequent packet (135) is generated according to a forward error correction technique, where a randomly selected subset of the original packets (121, 123, 125, . . . , 127) are combined via a predetermined function (e.g., a linear combination, an exclusive or (XOR) operation).

In one embodiment of the aspect, the method includes distributing the plurality of original packets (e.g., 121, 123, 125, . . . , 127) to the plurality of packet sequences (e.g., 115, 117, . . . , 119) for the plurality of parallel communication channels (e.g., 105, 107, . . . , 109) respectively according to a round-robin schedule (163). Alternatively, the method includes distributing the plurality of original packets (e.g., 121, 123, 125, . . . , 127) to the plurality of packet sequences (e.g., 115, 117, . . . , 119) for the plurality of parallel communication channels (e.g., 105, 107, . . . , 109) sequentially.

In one embodiment of the aspect, the subsequent packet (e.g., 135) is selected to be linearly independent of packets (e.g., 131, 133) that include the original packet (e.g., 131) and that are scheduled to be transmitted in a respective channel (e.g., 105) before the subsequent packet (135). The subsequent packet may be further selected to be linearly independent of further packets (e.g., 141, . . . , 151) that are transmitted in the plurality of parallel communication channels (e.g., 107, . . . , 109) other than the respective channel (e.g., 105) in which the subsequent packet (135) is transmitted.

In another aspect, a method implemented in a computing apparatus includes: generating, by the computing apparatus, a plurality of original packets (121, 123, 125, . . . , 127) of a same length from a data segment (111) to be transmitted via a plurality of parallel communication channels (105, 107, . . . , 109); and identifying, by the computing apparatus (e.g., using the scheduler (225)) from the original packets, a plurality of packet sequences (115, 117, . . . , 119) for the plurality of parallel communication channels (105, 107, . . . , 109) respectively. Each respective sequence (e.g., 115) of the plurality of packet sequences includes a subsequent packet (e.g., 135) that is scheduled to be transmitted in a respective channel (e.g., 105) of the plurality of parallel communication channels and that is linearly independent of packets (e.g., 131, 133) that are scheduled to be transmitted in the respective channel (e.g., 105) before the subsequent packet (e.g., 135). Further, the subsequent packet (e.g., 135) is a linear combination of a subset of the original packets (e.g., 121, 123, 125, . . . , 127). The method further includes transmitting, by the computing apparatus (e.g., using the transmitters (245, 247, . . . , 249)), the plurality of sequences (115, 117, . . . , 119) of packets in the plurality of parallel communication channels (105, 107, . . . , 109) respectively. During the transmitting, a recipient device (229) coupled to the plurality of parallel communication channels (105, 107, . . . , 109) is configured to determine whether a received set of packets (227), received via the parallel communication channels (105, 107, . . . , 109), is sufficient to reconstruct the data segment (111); and in response to a determination that the received set of packets (227) is sufficient to reconstruct the data segment (111), the recipient device (229) directly terminates the transmitting of the sequences of channel-encoded packets. Alternatively, the recipient device (229) transmits an indicator to the computing apparatus to stop the transmission of the remaining parts of the sequences (115, 117, . . . , 119).

In one embodiment of this aspect, the subsequent packet (135) is further selected to be linearly independent of further packets (e.g., 141, . . . , 151) that are transmitted in the plurality of parallel communication channels (107, . . . , 109) other than the respective channel (105) in which the subsequent packet (135) is transmitted. For example, the further packets (e.g., 141, . . . , 151) are evenly distributed in the plurality of parallel communication channels (e.g., 107, . . . , 109) other than the respective channel (105) in which the subsequent packet (135) is transmitted.

In one embodiment of this aspect, the further packets (141, . . . , 151) for the other channels (e.g., 107, . . . , 109) and the packets (e.g., 131, 133) that are scheduled to be transmitted in the respective channel (105) before the subsequent packet (135) form a base set (161) of packets; the base set (161) is selected to have fewer packets than the plurality of original packets (121, 123, 125, . . . , 127); and the subsequent packet (135) is selected to be linearly independent of the base set of data packets.

In one embodiment of this aspect, the subsequent packet (e.g., 135) is generated according to a forward error correction technique, which randomly selects the subset of the original packets (121, 123, 125, . . . , 127) according to a predetermined distribution, and combines the subset of the original packets (121, 123, 125, . . . , 127) using a linear function (e.g., exclusive or (XOR)). The random selection is repeated until the selected subset is linearly independent of the base set (161).

In one embodiment of this aspect, the method further includes: distributing the plurality of original packets (121, 123, 125, . . . , 127) to the plurality of packet sequences (115, 117, . . . , 119), according to a round-robin schedule (163), as initial packets of the packet sequences (115, 117, . . . , 119). Alternatively, the method further includes: distributing the plurality of original packets (121, 123, 125, . . . , 127) to the plurality of packet sequences (115, 117, . . . , 119) sequentially as initial packets of the packet sequences (115, 117, . . . , 119).

In a further aspect, a method implemented in a computing apparatus includes: identifying, by the computing apparatus (e.g., using the scheduler (225), compositions (e.g., 166) of a plurality of sequences (115, 117, . . . , 119) of packets to be transmitted respectively via a plurality of parallel communication channels (e.g., 105, 107, . . . , 109) to communicate a predetermined number of original packets (121, 123, 125, . . . , 127) of a same length to a recipient device (229). A composition (e.g., 166) of each respective packet (e.g., 143) in the plurality of sequences of packets includes an identification of each packet, among the original packets (121, 123, 125, . . . , 127), that is to be used to generate the respective packet (e.g., 143); and each respective sequence (e.g., 117) of the plurality of sequences includes at least one subsequent packet (143) that is a linear combination of a subset of the original packets (e.g., 121, 123, . . . , 125, 127) identified by a composition (e.g., 166) of the subsequent packet (143) to enable forward error correction. The computing apparatus stores the sequences (235, 237, . . . , 239) of compositions of the channel-encoded packets (e.g., 131, 133, 135, . . . , 139; 141, 143, 145, . . . , 149; 151, 153, 155, . . . , 159). After receiving a data segment (111), the computing apparatus generates the predetermined number of original packets (121, 123, 125, . . . , 127) from the data segment (111) and retrieves the sequences (235, 237, . . . , 239) of compositions to generate of the channel-encoded packets from the original packets (121, 123, 125, . . . , 127) according to the compositions. The computing apparatus uses the transmitters (235, 237, . . . 239) to transmit the plurality of sequences of channel-encoded packets (255, 257, . . . 259) in the plurality of parallel communication channels (105, 107, . . . , 109) respectively. During the transmitting, the recipient device (229) determines whether a current set of received packets (227), received via the parallel communication channels (105, 107, 109), is sufficient to reconstruct the data segment (101); and if so, the recipient device (229) either directly terminates the transmission of remaining packets in each of the channels (105, 107, . . . , 109), or transmits an indicator to the computing apparatus (e.g., via the transmitters 245, 247, . . . , 249) to stop the transmission of remaining packets in each of the channels (105, 107, . . . , 109).

In one embodiment of this aspect, the identification of the sequences (115, 117, . . . , 119) includes initially distributing the plurality of original packets (121, 123, 125, . . . , 127) to the plurality of sequences (115, 117, . . . , 119) according to a round-robin or sequential schedule (163) as the initial packets of the sequences (115, 117, . . . , 119).

In one embodiment of this aspect, the channel-encoded packets are generated from the original packets (121, 123, 125, . . . , 127) according to the compositions based on an exclusive or (XOR) operation applied on subsets of the original packets (121, 123, 125, . . . , 127) identified by the compositions of the respective channel-encoded packets.

In one embodiment of this aspect, the composition (166) of the subsequent packet (143) is a randomly selected subset of the original packets (121, 123, 125, . . . , 127); and the randomly selected subset is selected such that it has a composition that is linearly independent of the compositions of: packets (123) that are queued in the respective sequence (117), in which the subsequent data packet (143) belongs, before the subsequent data packet (143); and one or more initial packets (121, 125, . . . ) that are queued in plurality of sequences (115, 119, . . . ) other than the respective sequence (117) in which the subsequent data packet (143) belongs.

Figure 13:
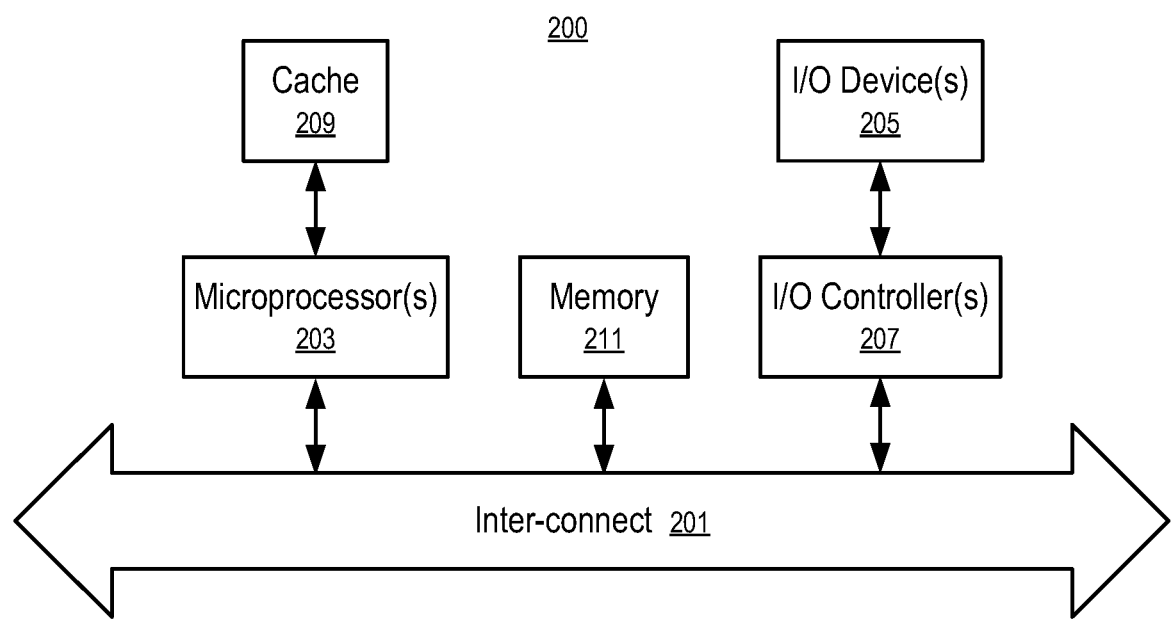
FIG. 13 shows a data processing system on which the methods of the present disclosure can be implemented.

The scheduler (225), the transmitters (245, 247, . . . , 249), the recipient device (229) and/or other devices used in the system of FIG. 6 and/or the methods discussed above can be implemented using a data processing system as illustrated in FIG. 13, with more or less components.

The performance of the communication systems discussed above (e.g., as illustrated in FIG. 1, 2, 3 or 6), or other communication systems that use forward error correction, can be optimized or improved for the transmission of a given data segment (111) by adjusting/optimizing the number of packets (121, 123, 125, . . . , 127) into which the data segment (111) is partitioned.

When the data segment (111) is partitioned into different numbers of packets (121, 123, 125, . . . , 127) for transmission using a forward error correction technique, the transmission has different data communication overheads and/or computation overheads. The cost of the overheads can be evaluated as a function of the number of packets used in partitioning the data segment (111) of a given size. An optimized number of packets used in partitioning the data segment (111) is then determined from the cost function.

Figure 9:
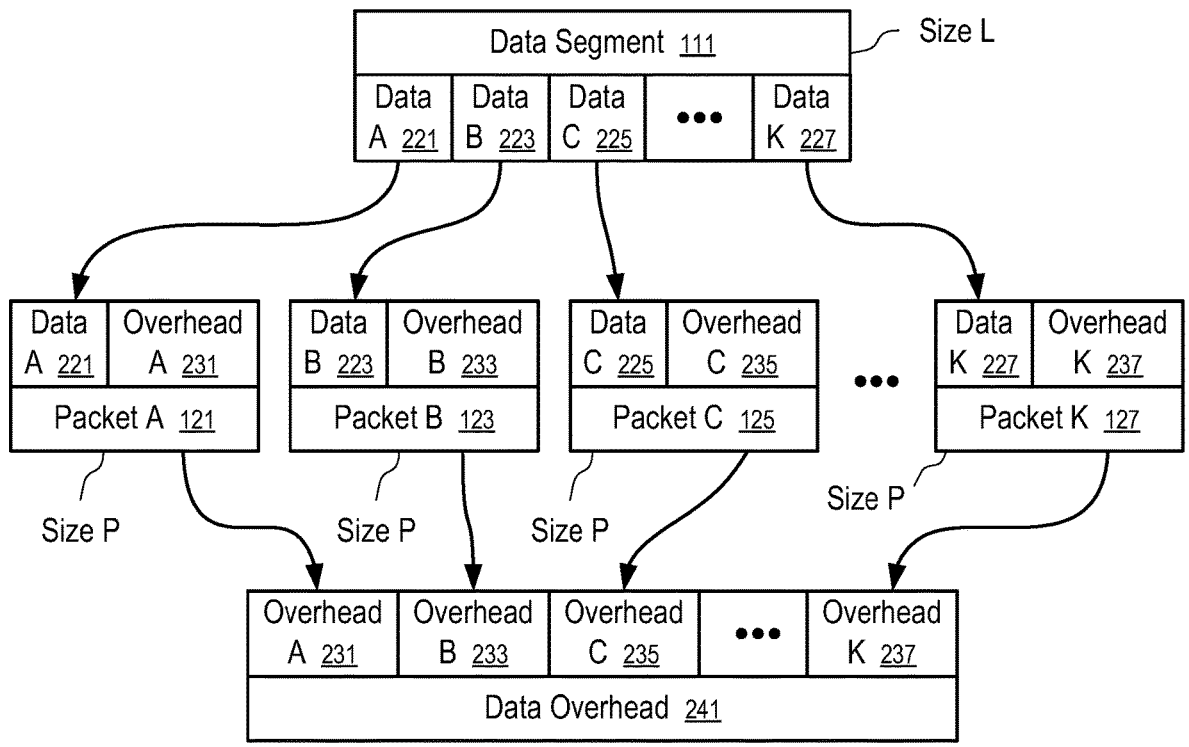
FIG. 9 illustrates an overhead cost in data communication for transmitting a data segment by dividing the data segment into a plurality of data packets for forward error control.

FIG. 9 illustrates an overhead cost in data communication for transmitting a data segment by dividing the data segment into a plurality of data packets for forward error control.

In FIG. 9, the data segment (111) has a data size of L (e.g., measured in bytes when the smallest unit of data communication in the system is a byte). When the data segment (111) is partitioned into K packets of an equal size P, it is typical that the sum of sizes (e.g., K*P) of the packets (121, 123, 125, . . . , 127) does not equal to the size L of the data segment (111); and as a result, some or all of the packets (121, 123, 125, . . . , 127) have dummy data (e.g., with zeros, ones, or random data) added therein to ensure that the packets (121, 123, 125, . . . , 127) have the same size P. The sum of the overheads (231, 233, 235, . . . , 237) in the data packets (121, 123, 125, . . . , 127) due to the padding provides the size of the data overhead (241) (e.g., K*P−L).

When the data (221, 223, 225, . . . , 227) of the data segment (111) is distributed to K data packets (121, 123, 125, . . . , 127), the minimum size P for the data packets (121, 123, 125, . . . , 127) is the smallest integer that is greater than or equal to L/K.

The data (221, 223, 225, . . . , 227) of an equally length can be distributed from the data segment (111) to the packets (121, 123, 125, . . . , 127) such that the overheads (231, 233, 235, . . . , 237) in the packets (e.g., in the form of padded zeros, ones or random data) have an equal length.

Alternatively, different packets (e.g., 121, 123, 125, . . . , 127) may have overheads (231, 233, 235, . . . 237) of different sizes. For example, each of the packets (121, 123, 125, . . . ) except the last packet (127) has no overhead in one arrangement; and the last packet (127) carries the entire data overhead (241) (e.g., K*P−L, where P is at least the smallest integer that is greater than or equal to L/K).

Transmitting the data overhead (241) is the extra cost for transmitting the data segment (111) by dividing the data segment (111) into the packets (121, 123, 125, . . . , 127) of the same length for channel encoding using a forward error correction technique.

The original packets (121, 123, 125, . . . , 127) having the data overhead (241) can be used to generate the packets in the copies (115, 117, . . . , 119) for transmission over parallel channels (105, 107, . . . , 109), as illustrated in FIGS. 1-8.

Figure 10:
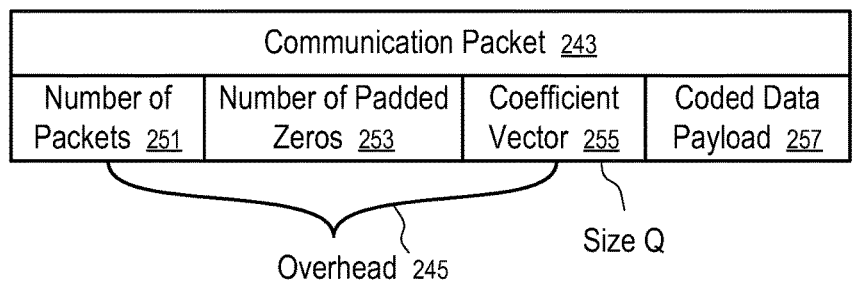
FIG. 10 illustrates the data structure of a communication packet of one embodiment.

FIG. 10 illustrates the data structure of a communication packet of one embodiment.

For example, the communication packet (243) can be used to transmit a typical packet in the copies (115, 117, . . . , 119) illustrated in FIG. 1, 2, or 3, or one of the channel-encoded packets (225, 257, . . . , 259) illustrated in FIG. 6.

In FIG. 10, the communication packet (243) includes a plurality of data fields to provide information that can be used for decoding. For example, the communication packets (243) includes fields specifying the number of packets K (251), the number of padded zeros (or ones, or random data, or dummy data) (253) in the coded data payload (257), and the coefficient vector (255) (e.g., the composition (166) of a channel-encoded packet (143)) used to generate the coded data payload (257) from the packets (121, 123, 125, . . . , 127), in addition to the field for the coded data payload (257) that has the size P.

The coefficient vector (255) identifies the composition vector (e.g., 166) of a channel-encoded packet (243). The first K bits of the coefficient vector (255), as identified by the field of number of packets K (251), correspond to the K original packets (121, 123, 125, . . . , 127) respectively. When the i'th bit in the coefficient vector (255) has a first value (e.g., 1), the i'th packet in the packets (121, 123, 125, . . . , 127) is used to generate the coded data payload (257) transmitted via the communication packet (243); and when the i'th bit in the coefficient vector (255) has a second value (e.g., 0), the i'th packet in the packets (121, 123, 125, . . . , 127) is not used to generate the coded data payload (257) transmitted via the communication packet (243). The data fields (251, 253, and 255) for providing the information to assist the recipient device (229) in decoding the coded data payloads (e.g., 257) are the overhead (245) in the communication packet (243).

The number of packets K (251) and the number of padded zeros (ones, random data, or dummy data) (253) in the coded data payload (257) can be transmitted for each communication packet used to transmit a packet in the copies (e.g., 115, 117, . . . , 119). In other implementations, the number of packets K (251) and the number of padded zeros (or ones or random data) (253) in the coded data payload (257) are transmitted only once for each of the copies (e.g., 115, 117, . . . , 119) to reduce overhead. In other implementations, additional data fields may be included for each communication packet (243).

The number of packets K (251) is typically limited to be less than a predetermined limit (e.g., 256). Thus, the size of data field for the number of packets K (251) is predetermined (e.g., 1 byte) does not change as a function of the number of packets K (251). Further, the data field for the number of padded zeros (or ones or random data) (253) has a predetermined size (e.g., 4 bytes) that is not a function of the number of packets K (251).

However, the size of the field of the coefficient vector (255) typically changes as a function of the number of packets K (251). For example, the minimum size Q of the coefficient vector (255) (e.g., in bytes) is equal to the smallest integer that is greater than or equal to K/8.

Figure 11:
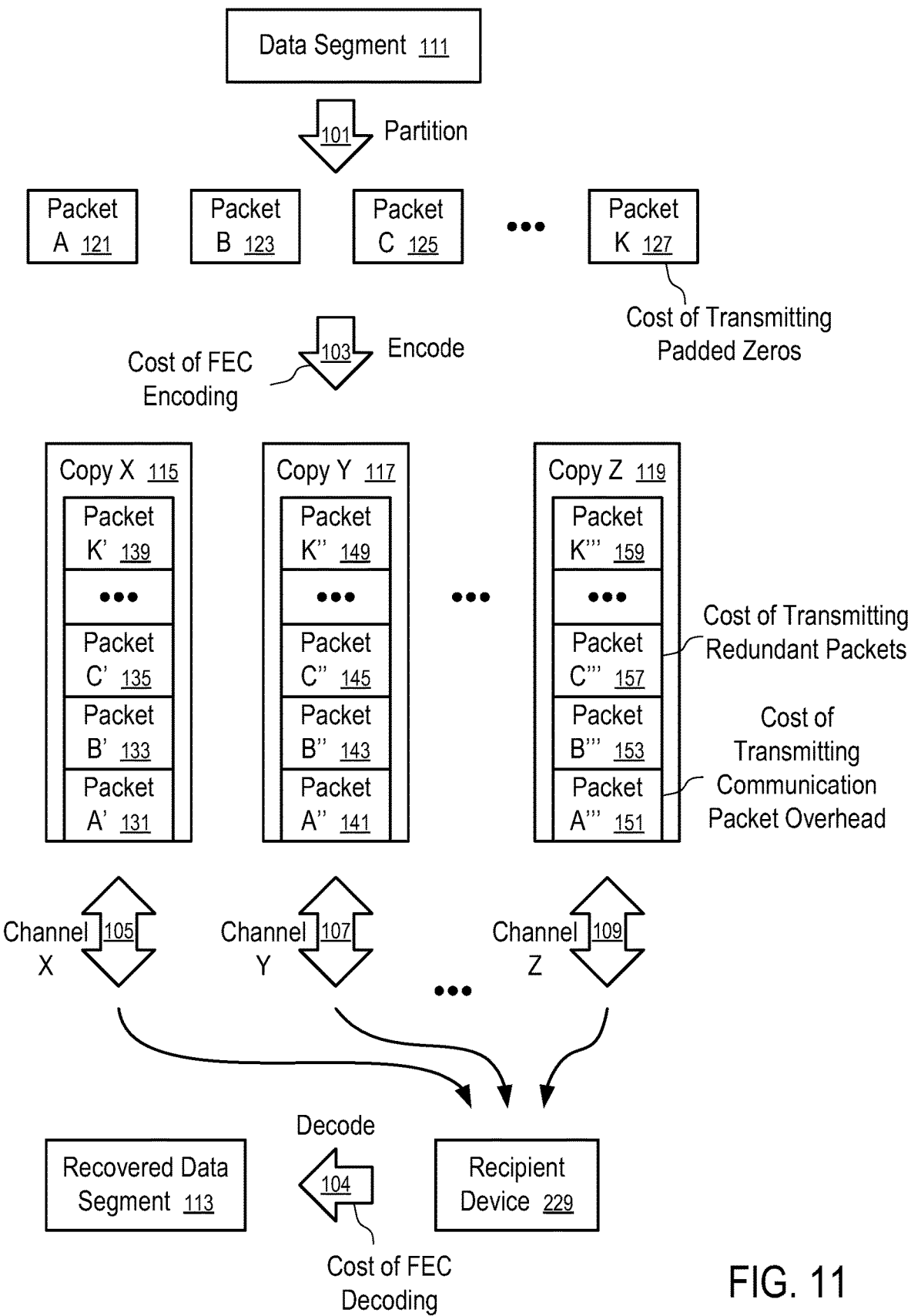
FIG. 11 illustrates various cost considerations in the transmission of a data segment using a forward error correction technique.

FIG. 11 illustrates various cost considerations in the transmission of a data segment using a forward error correction technique.

In FIG. 11, partitioning (101) the data segment (111) having a size L into the original packets (121, 123, 125, . . . , 127) having an equal size P results in the data overhead (241) as illustrated in FIG. 9. The cost of transmitting the padded zeros (ones, random data, or dummy data) corresponding to the transmission cost of the data overhead (241).

In FIG. 11, transmitting each packet (e.g., 131, 133, 135, . . . , 139; 141, 143, 145, . . . , 149; . . . ; 151, 153, 157, . . . , or 159) using the forward error correction technique results in the transmission of additional data fields (e.g., 251, 253, 255 illustrated in FIG. 10) and thus the overhead (245). The cost of transmitting the overhead in each communication packet (243) used to carry a respective data packet in the copies (115, 117, . . . , 119) corresponds to the cost of transmitting communication packet overhead.

In FIG. 11, there is a computation cost of the forward error correction technique in encoding (103) the original packets into the packets (115, 117, . . . , 119) and/or decoding the copies to generate the recovered data segment (113). The computation cost is typically a function of the number of original packets K (251) into which the data segment (111) is partitioned. When fountain codes are used in FEC, the cost of the computational complexity is typically in the order of log (K). Alternatively, the cost function of computational complexity may be empirically measured, or derived from curving a set of data points.

Further, due to the uncertainty in the communication system (e.g., random delay in the channels), the actual number of packets the recipient device (229) will receive from each of the channels (105, 107, . . . , 109) is random before the recipient device (229) obtains sufficient packets for decoding (104) and then prevents the further transmission of the remaining packets. This introduces uncertainty in usefulness of the received packets, which causes that more than K communication packets are communicated via the channels (105, 107, . . . , 109) as a whole before the recipient device (229) receives a sufficient number (e.g., K) of useful packets for the generation of the recovered data segment (113) and thus terminates the transmission. The exact number of additional communication packets transmitted via the system changes as the uncertainty in the communication system (e.g., random delays in the channels in transmitting the packets of the copies). An estimated (or average number, or an upper limit) of the additional communication packets over the number of packets K can be used to determine the cost of transmitting redundant packets (not useful packet for decoding the channel-encoded packets).

For example, when the copies (115, 117, 119) are generated using a round-robin (or sequential) allocation (163) scheme (e.g., as illustrated in FIG. 4) with subsequent channel-encoded packets generated to be linearly independent of their base sets (e.g., as illustrated in FIG. 5), no more than K+d communication packets (e.g., d=3) are expected to be transmitted in the communication system over the parallel communication channels (1105, 107, . . . , 109), before the transmission can be terminated. Thus, the cost of transmitting the redundant packets can be estimated as the size of the additional d communication packets.

For example, when the data segment of a size L is partitioned (101) into K original packets (121, 123, 125, . . . , 127), the minimal size P of each original packets (121, 123, 125, . . . , 127) is the smallest integer that is large than or equal to L/K. Thus, the field for coded data payload (257) of the communication packet has a size of P. The field for the coefficient vector (255) has a size of Q which is at least the smallest integer that is larger than or equal to K/8. When the communication packet uses one byte to transmit the number of packets (251), four bytes to transmit the number of padded zeros (253) (or padded ones, random data or dummy data), the size of the communication packet (243) is (5+Q+P). When K+d (e.g., d=3) of communication packets (243) are used to transmit the data segment in order for the recipient device (229) to generate the recovered data segment (113), the total size of the transmitted communication packets is (5+Q+P)*(K+d); and the bandwidth cost, including the cost for transmitting the data overhead (241), the cost for transmitting the communication packet overhead (245), and cost for transmitting the redundant packets transmitted before the termination, is proportional to (5+Q+P)*(K+d). The cost of FEC encoding (103) and/or decoding (104) is typically proportional to L*log(K).

The cost of FEC encoding (103) and/or decoding (104) and the cost of the communication (e.g., data overhead (241), communication packet overhead (245), redundant packets) may have different weight. Different weights can be assigned to the computation cost and the communication cost to generate a combined cost function of the number K to partition (101) the data segment (111) into the original K packets (121, 123, 125, . . . , 127). An optimized K can be determined from the cost function for the partition (101) of the data segment (111).

Figure 12:
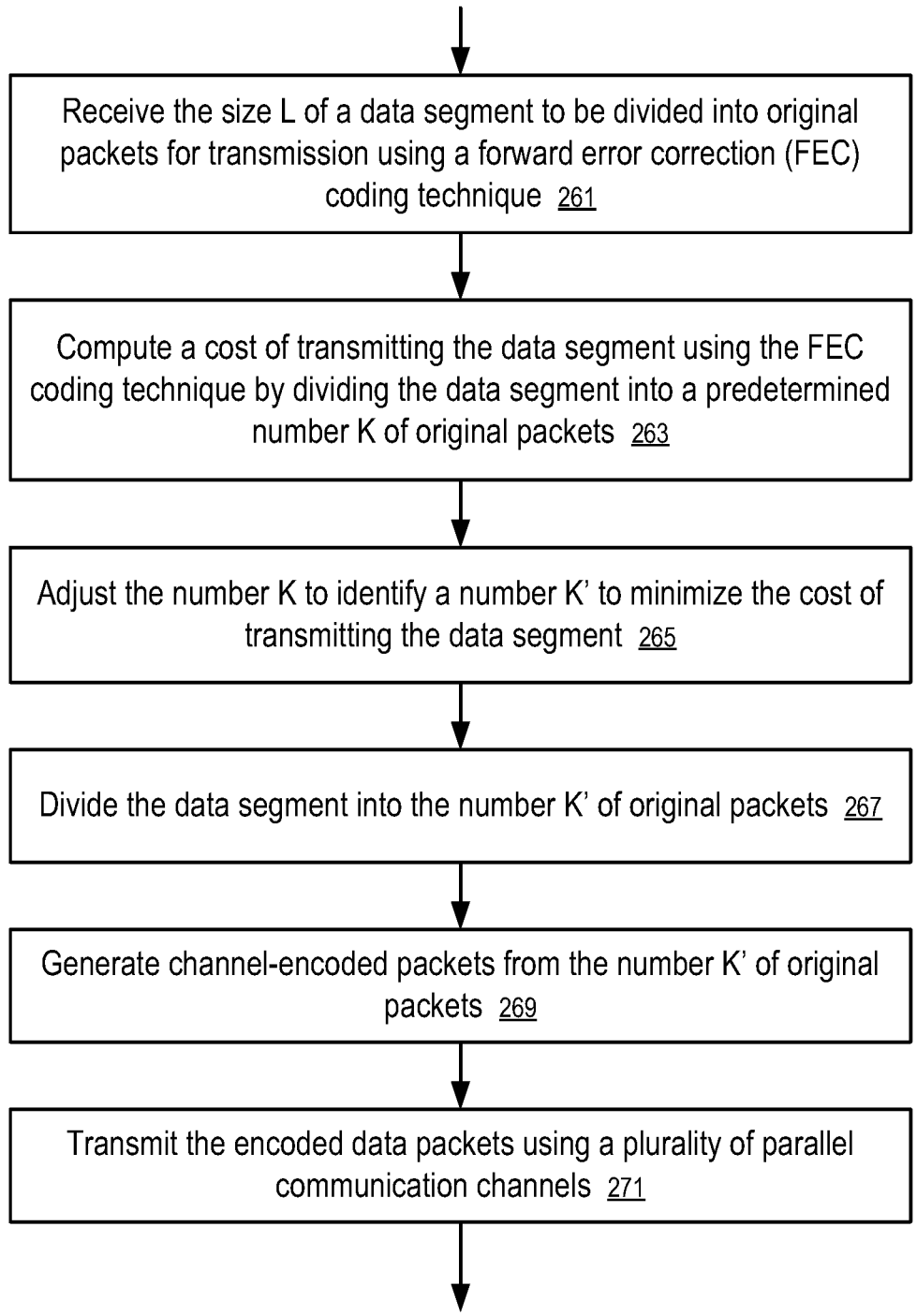
FIG. 12 shows a method to transmit a data segment according to one embodiment.

FIG. 12 shows a method to transmit a data segment according to one embodiment.

In FIG. 12, after receiving (261) the size L of a data segment (111) to be divided into original packets (121, 123, 125, . . . , 127) for transmission using a forward error correction (FEC) coding technique, a computing device is configured to compute (263) a cost of transmitting the data segment (111) using the FEC coding technique by dividing the data segment (111) into a predetermined number K of original packets (121, 123, 125, . . . , 127). The cost may include the communication cost of the data overhead (241) as illustrated in FIG. 9, the communication cost of the overhead (245) in communication packet (243) as illustrated in FIG. 10, the computing cost of the FEC coding technology as illustrated in and discussed in connection with FIG. 11, and/or the communication cost of the redundant packets, as illustrated in and discussed in connection with FIG. 11.

In FIG. 12, the computing device adjusts (265) the number K to identify a number K' to minimize the cost of transmitting the data segment.

After the number K' is identified, the computing device divides (267) the data segment (111) of size L into the number K' of original packets (121, 123, 125, . . . , 127), generates (269) channel-encoded packets (e.g., 131, 133, 135, . . . , 139; 141, 143, 145, . . . 149; . . . ; 151, 153, . . . , 159) from the number K' of original packets (121, 123, 125, . . . , 127), and transmit (271) the channel-encoded packets (e.g., 131, 133, 135, . . . , 139; 141, 143, 145, . . . 149; . . . ; 151, 153, . . . , 159) using a plurality of parallel communication channels (105, 107, . . . , 109).

For example, the method of FIG. 12 can be implemented in a system illustrated in FIG. 11. The copies (115, 117, . . . , 119) of packets to be transmitted via the parallel communication channels (105, 107, . . . , 109) can be generated using the techniques of FIG. 2 or 3, where the distribution of systematic packets can be performed using the technique of FIG. 4, and the compositions of subsequent channel-encoded packets can be identified using the technique of FIG. 5. Further, the compositions can be pre-computed in a way as illustrated in FIG. 6.

In some implementations, an explicit expression is derived for the cost as a function of the number K of original packets into which the data segment (111) of the size L is partitioned (101). An explicit function can be derived to compute the optimized K' as a function of the size L of the data segment (111) to be transmitted.

In some implementations, a table of optimized K' is pre-computed as a function of the size L of the data segment (111) for a particular communication system (e.g., having its unique weight of the communication cost for communication over the channels (105, 107, . . . , 109) and the computation cost for FEC encoding (103) and/or decoding (104). Subsequently, the optimized K' for a given size L of a particular data segment (111) can be looked up from the table.

In some implementations, an empirical formula (e.g., generated from curve fitting the table of K' vs. L) is used to compute the optimized number K' of division from a given size L of the data segment (111).

In some implementations, the optimized K' is computed just in time for the transmission of the data segment (111) having the size L, in view of the cost characteristics of the communication system available to transmit the data segment (111) using a FEC technique.

In one aspect, a method implemented in a computing apparatus includes: receiving, in the computing apparatus, a size L of a data segment (111) to be transmitted by the computing apparatus; and determining, by the computing apparatus, a number K by optimizing a cost of transmitting the data segment (111), such that the data segment (111) is divided into the number K of original packets (121, 123, 125, . . . , 127) based on which channel-encoded packets (e.g., 143 in FIG. 2 or 5), are generated for transmission using a forward error correction technique. Any optimization techniques can be used to search for and/or compute the optimal K from the function of the cost of transmitting the data segment (111).

In one embodiment of the aspect, after the optimal K is determined, the computing apparatus partitions (101) the data segment (101) having the size L into the number K of original packets (121, 123, 125, . . . , 127), generates a plurality of copies (115, 117, . . . , 119) of packets from the original packets (121, 123, 125, . . . , 127) using the forward error correction technique, and transmits, to a recipient device (229), the plurality of copies (115, 117, . . . , 119) of packets using a plurality of parallel communication channels (105, 107, . . . , 109) respectively. The recipient device (229) determines whether a received set of packets received via the parallel communication channels (105, 107, . . . , 109) is sufficient to generate the recovered data segment (113), and if so, causes termination of the transmission of the copies (115, 117, . . . , 119), when sufficient numbers of useful packets have been received in the recipient device from the channels (105, 107, . . . , 109).

The cost of transmission considered for the optimization may include: first data transmission cost for dummy data (e.g., overhead 241) added to the original packets (121, 123, 125, . . . , 127) so that the original packets have a same size P; second data transmission cost for data in communication fields (e.g., 251, 253, 255) added in communication packets (e.g., 243) to enable decoding using the forward error correction technique (e.g., overhead 245); and/or third data transmission cost for redundant communication packets that are expect to be transmitted to the recipient device (229) before the termination of the transmission. The third data transmission cost can be estimated based on a count of maximum (or average, or expected) redundant communication packets that are expected to be transmitted via the parallel channels (105, 107, . . . , 109) before the termination of the transmission of the copies (115, 117, . . . , 119). When the techniques for generating the copies (115, 117, . . . , 119) as illustrated in FIGS. 1-5 are used, the count is typically three using communication channels that each can transmit data reliably but may have different and/or varying transmission speeds.

Further, the cost of transmission considered for the optimization may include computation cost associated with application of the forward error correction technique, which is typically proportional to a logarithm function of the number K of original packets (121, 123, 125, . . . , 127).

Typically, the number K of original packets is limited to be no more than 256. The cost for different values of K can be computed individually to find the optimal K that minimizes the cost of transmission.

When the technique of FIG. 4 is used, the plurality of copies (115, 117, . . . , 119) can be generated from the original packets (121, 123, . . . , 125, 127) by distributing the original packets (121, 123, . . . , 125, 127) to the copies according to a round-robin scheme or a sequential scheme as the initial/leading packets of the copies (115, 117, . . . , 119).

When the technique of FIG. 5 is used, the plurality of copies (115, 117, . . . , 119) can be generated from the original packets (121, 123, . . . , 125, 127) by selecting a subset of the original packets (e.g., as identified by the composition (166) in FIG. 5) such that the subset is linearly independent on a base set (165) of packets in the copies (115, 117, . . . , 119). A subsequent channel-encoded packet (e.g., 143) is generated from the subset for transmitting in a particular copy (117) of the plurality of copies (e.g., 115, 117, . . . , 119). The base set includes one or more packets (e.g., 123) of the particular copy that are scheduled to be transmitted before the subsequent channel-encoded packet (143). The base set may further include at least initial packet (e.g., packet (121) in copy (115), packet (125) in copy (119)) in each of the plurality of copies. Preferably, the subset does not include any of original packets (e.g., 123) allocated to the particular copy (117).

For example, the subsequent channel-encoded packet (143) can be generated from exclusive or of the packets in the subset; and the subset is selected randomly according to a predetermined distribution. The random selection can be repeated until the selected subset is linearly independent of the base set (165) and/or does not include any of the original packets allocated to the particular copy (117) and/or does not include any of the original packets in the base set (165).

The present disclosure includes the methods discussed above, computing apparatuses configured to perform methods, and computer storage media storing instructions which when executed on the computing apparatuses causes the computing apparatuses to perform the methods.

FIG. 13 shows a data processing system on which the methods of the present disclosure can be implemented. While FIG. 13 illustrates various components of a computer system, it is not intended to represent any particular architecture or manner of interconnecting the components. One embodiment may use other systems that have fewer or more components than those shown in FIG. 13.

In FIG. 13, the data processing system (200) includes an inter-connect (201) (e.g., bus and system core logic), which interconnects a microprocessor(s) (203) and memory (211). The microprocessor (203) is coupled to cache memory (209) in the example of FIG. 13.

In one embodiment, the inter-connect (201) interconnects the microprocessor(s) (203) and the memory (211) together and also interconnects them to input/output (I/O) device(s) (205) via I/O controller(s) (207). I/O devices (205) may include a display device and/or peripheral devices, such as mice, keyboards, modems, network interfaces, printers, scanners, video cameras and other devices known in the art. In one embodiment, when the data processing system is a server system, some of the I/O devices (205), such as printers, scanners, mice, and/or keyboards, are optional.

In one embodiment, the inter-connect (201) includes one or more buses connected to one another through various bridges, controllers and/or adapters. In one embodiment the I/O controllers (207) include a USB (Universal Serial Bus) adapter for controlling USB peripherals, and/or an IEEE-1394 bus adapter for controlling IEEE-1394 peripherals.

In one embodiment, the memory (211) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Control of Multipath Data Transportation

Figure 14:
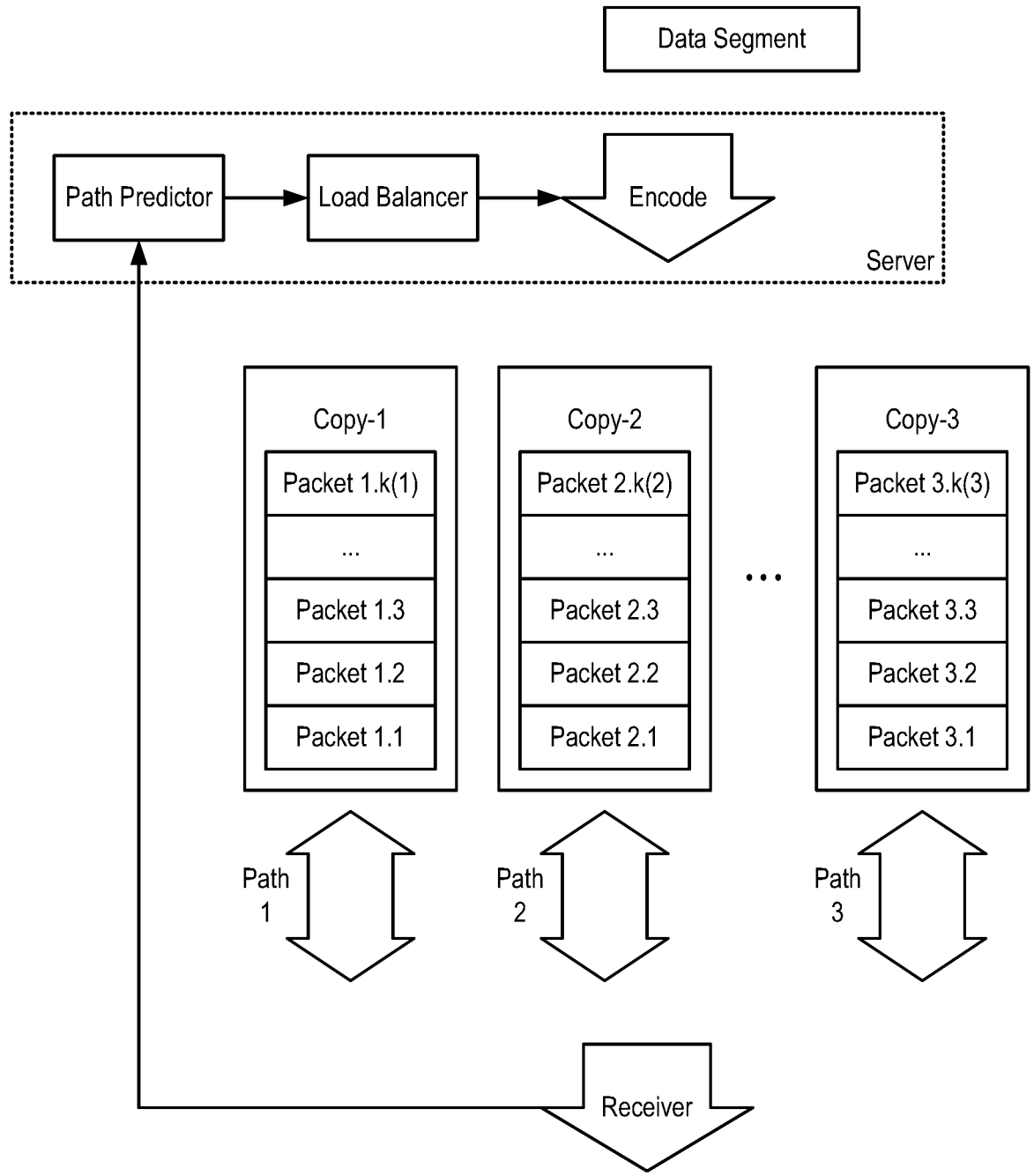
FIG. 14 shows a multipath data transportation system having a control unit implemented at a server side according to one embodiment.

FIG. 14 shows a multipath data transportation system having a control unit implemented at a server side according to one embodiment. The control unit includes two primary components:

A load balancer that balances the load of each path for optimal performance (e.g., high throughput, high robustness, low redundancy);

A path predictor that predicts the quality (e.g., latency, bandwidth, packet loss) of each path.

The load balancer solves an optimization problem of the multipath data transportation system. Using this solution, the load balancer controls the encoding process that is applied to the data segment received by the server. The encoding process generates communication packets in the form of copies, and which are distributed to paths 1, 2, . . . , 3 as described below.

In one embodiment, the system generates multiple coded copies of a data segment. Each copy will be downloaded through a different path. The control unit decides the size of each copy based on the quality of each path. The system is configured to 1) maximize aggregated throughput, 2) minimize redundancy, 3) maximize robustness, and 4) minimize decoding complexity.

As discussed further below, when determining the number of paths to use for transmission, the number of used paths is first determined by assuming no transmission time window. It may then be further increased if a transmission time window is imposed.

In one embodiment, feedback from the receiver is provided to the path predictor as shown in FIG. 14. In one embodiment, each path is one of the channels 105, 107, 109 of FIG. 1. In one embodiment, the data processing system of FIG. 13 above is used to implement the multipath data transportation system (including the control unit). In one embodiment, the control unit is located in the server of FIG. 14. In another embodiment, the control unit is located in the receiver (e.g., the recipient device of FIG. 1 above).

In one embodiment, a data segment is a video frame in a video streaming system. Such systems typically generate 30 to 60 video frames per second. Correspondingly, a typical server is a video streaming server, and a typical receiver is a video player. One example is a cloud gaming system. In this system, the cloud gaming server executes the game using a cloud GPU, renders the gaming video and sends video frames to the player computing device (receiver). The player receives these frames and plays the video. This way, the player does not need high-end hardware to execute the game.

In one embodiment, as discussed in more detail below, an optimal load K(n) is determined for each path when sending a data segment. K(n) is the number of packets to be sent through path-n. By assuming N' paths with the shortest single-trip-time STTn are used, the goal is to complete the download of K(n) (n=1, 2, . . . , N') at the same time. This download time for path-n is Tn=STTn+K(n)/BWPn, where BWPn is the bandwidth of path-n in terms of packets per second. By solving equation T1=T2= . . . =TN' under the constraint that the sum of K(n) packets allow the decoding of the data segment, K(n) can be determined. The N' and the corresponding set of K(n) that minimizes the download time is the optimal solution, which may be further adjusted when constraints such as transmission time window apply.

Various terminologies, abbreviations, and notations are set forth below as used in the following discussion of various embodiments of the multipath data transportation system.

| | |
|---|---|
| Communication packet | A packet generated from original data packets using a coding technique. There are two types of communication packets: systematic and coded. |
| Coded packet | A type of communication packet, it is the binary XOR of a subset of the original data packets, plus overhead. |
| Systematic packet | An original data packet plus overhead. |
| Copy | The set of communication packets sent through a path. It consists of some systematic packets, followed by some coded packets. |

| | |
|---|---|
| BW | Bandwidth |
| FPS | Frame-per-second |
| HTTP | Hypertext Transfer Protocol |
| PLR | Packet loss rate |
| RTT | Round-trip-time |
| STT | Single-trip-time |
| TCP | Transmission Control Protocol |
| UDP | User Datagram Protocol |

| | |
|---|---|
| BWn | The bandwidth of path-n |
| BWPn | The number of communication packets the server can send through path-n in one second |
| BWPRn | The number of communication packets the receiver can receive from path-n in one second |
| C(n) | The number of coded packets sent through path-n |
| K | The number of original data packets in a data segment. It is also the minimum number of communication packets the receiver must receive in order to decode the data segment. |
| K(n) | The number of communication packets sent through each path. K(n) = S(n) + C(n) |
| Kcomp(n) | The number of leftover packets compensated by path-n |
| Kleft | The packets left over from path-n due to the transmission time window |
| Kmax(n) | The maximum number of communication packets that can be sent through path-n due to the transmission time window |
| N | The number of paths |
| PLRn | The inherent and inevitable PLR of path-n due to noise, interference, etc. |
| Pr | The receiver observed PLR, including those due to noise and congestion. |
| r | The data transmission rate (i.e., the rate at which data is pushed to the path). |
| S(n) | The number of systematic packets sent through each path. |
| Tw | The transmission time window of the data segment, after which the segment will expire. |
| STTn | The STT of path-n |
| T | The data segment delivery time. It is the time between the server starts sending and the receiver receives enough communication packets to decode. |
| t(n) | The time between the server starts sending and the receiver finishes its reception of communication packets sent through path-n |

In one embodiment, the multipath data transportation system sends a data segment using multiple network paths. At a high level, it generates different copies of the original data segment using a coding technique, and then sends different copies through different paths. In one embodiment, channel encoding (103) of original packets (121, 123, 125, . . . , 127) that generates different channel-encoded copies (115, 117, . . . , 119) as was described in FIG. 1 above is used to provide the different copies for sending through the different paths. The coding technique allows the receiver to recover the original data segment if the total amount of datagram received from all paths is equal to or slightly greater than the size of the original segment.

Specifically, a data segment (e.g., data segment 111 of FIG. 1) is partitioned into K equal-length original data packets (e.g., packets 121, 123, 125, and 127 of FIG. 1). These original data packets are encoded into a minimum of K communication packets (e.g., Packets 1.1, 1.2, . . . , 1.$k$(1) as shown in FIG. 14) using the coding technique. It should be noted that in other embodiments different coding techniques from those described above may be used. For example, other binary codes such as low-density-parity-check (LDPC) code or Bose-Chaudhuri-Hocquenghem (BCH) code with sufficiently large coding sizes could be used.

There are two types of communication packets:

Systematic packet: Each systematic packet is one of the K original data packets, plus a header (also referred to herein as overhead). Thus, the coding technique will generate a total of K systematic packets, and this number is fixed regardless of the number of paths.

Coded packet: It is the binary XOR of multiple original data packets, plus a header. The coding technique is able to generate any number of coded packets.

Each communication packet is sent through one of the multiple paths. A copy is the set of communication packets sent through the same path. When the total number of communication packets received by the receiver from all paths is K+δ, where δ≥0 is a small integer, the receiver can decode the K original data packets and, thus, recover the data segment.

For such a system, there are four performance metrics that are optimized:

Throughput: minimize the time spent on the download;

Reliability: maximize the probability that the receiver receives enough communication packets for successful decoding. This metric is particularly important when the underlying transportation layer protocol is unreliable (e.g., UDP);

Redundancy: minimize the redundant packets the receiver will receive after decoding.

Decoding complexity: maximize the number of systematic packets the receiver will receive before decoding, as these packets do not require decoding. Equivalently, the number of coded packets the receiver will receive before decoding is minimized.

As explained below, these performance metrics are dominated by the way in which the communication packets are sent. Specifically, there are two transmission parameters to optimize:

the number K(n) of communication packets to be sent through path-n, for all the N paths. This number consists of the number S(n) of systematic packets and the number C(n) of coded packets to be sent through each path;

the transmission rate at which the coded packets should be sent.

To optimize these two parameters, the control unit of the multipath data transportation system is used. The control unit includes two components, namely a load balancer and a path predictor, as discussed further below.

Overview of Control Unit

Figure 15:
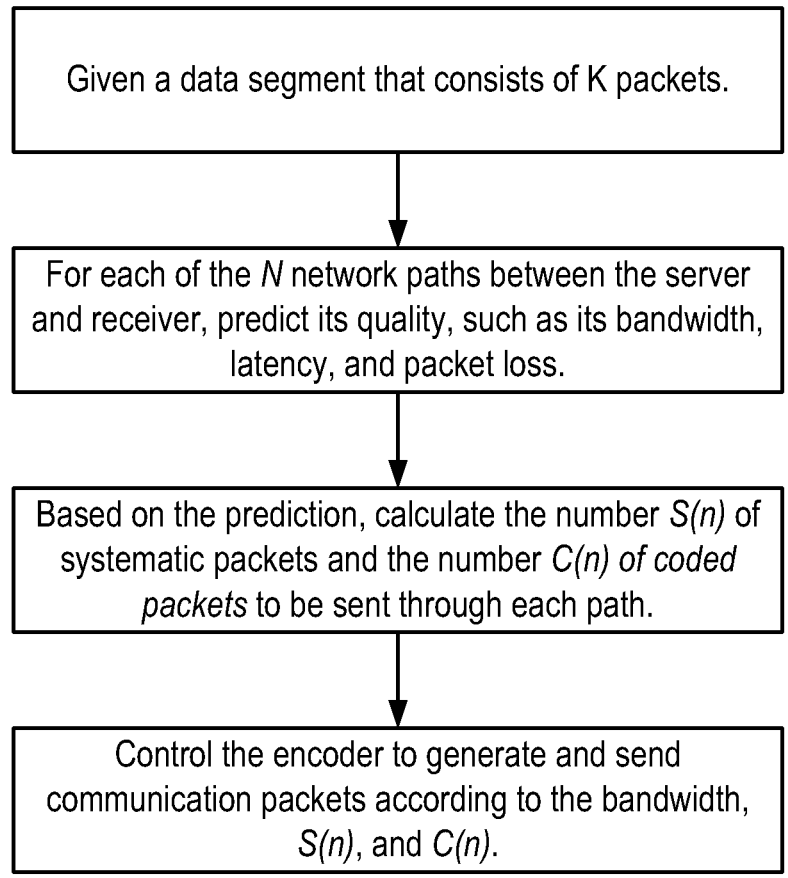
FIG. 15 shows a flow chart of the control unit of the multipath data transportation system according to one embodiment.

In one embodiment, a flow chart of operation for the control unit is illustrated in FIG. 15. The control unit has two core components:

Path predictor: It predicts the quality of each path, such as its BW (bandwidth), RTT (round-trip-time), and PLR (packet loss rate);

Load balancer: based on the prediction, it decides the copy size (i.e., the number of communication packets) and transmission rate for each path.

The load balancer is discussed in more detail below, including a discussion of how to optimize the size K(n) of each copy. In one embodiment, the transmission rate is simply set it to the BW of each path to maximize throughput. The path predictor is discussed later below after the discussion of the load balancer.

Load Balancer

In one embodiment, communication packets (including K systematic packets and a certain number of coded packets) of a data segment are generated and each communication packet is sent through one of the multiple network paths. In this embodiment, the transmission rate is set to the BW of each path. The number of communication packets to be sent through each path is designed to optimize throughput, redundancy, reliability, and decoding complexity. This is demonstrated in more detail below.

In the following discussion for FIGS. 16-19, it is assumed for purposes of illustration that N=2 paths are used. The 1st (respective 2nd) path has a single-trip-time (STT) of STT1 (respective STT2). Thus, after the server (Tx) starting to send coded packets at time t1, the receiver (Rx) will start to receive from path-1 (respective path-2) at time t2=t1+STT1 (respective t3=t1+STT2). For each path-n, S(n) systematic packets are first sent, followed by C(n) coded packets. Here, {S(n)} across all the N paths satisfy that:

$$\sum_{n=1}^{N} S(n) = K$$

In other words, each path will deliver a different subset of the K systematic packets.

Figure 16:
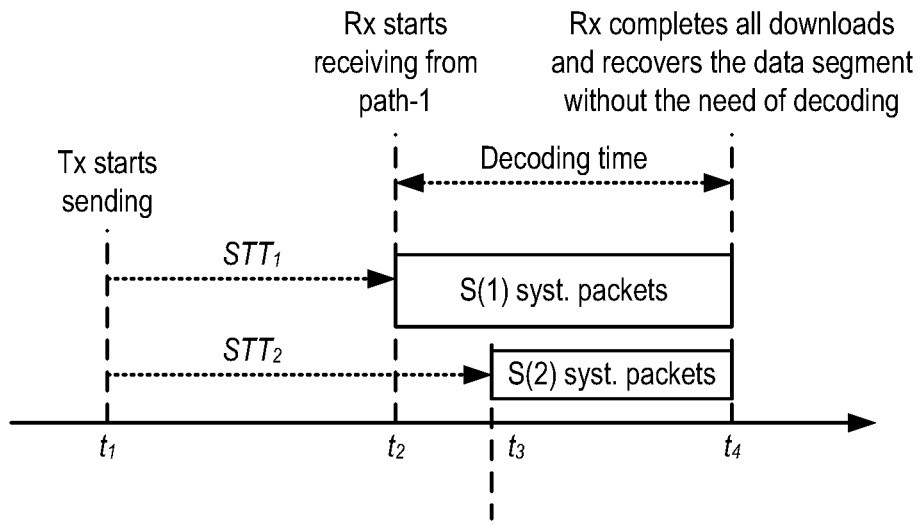
FIG. 16 illustrates an ideal simultaneous download completion of systematic packets without packet loss according to one embodiment.

An ideal example of delivery is shown in FIG. 16, which assumes no packet loss in any of the N paths. {S(n)} of both paths are optimized, so that the receiver can finish the download of both S(1) and S(2) at the same time t4. Since the {S(n)} systematic packets carry the K original data packets, the receiver can directly recover the data segment without any decoding.

On the other hand, if {S(n)} are not optimized, the receiver will receive coded packets before being able to recover the data segment. This will introduce decoding cost.

In a more general, practical scenario, there will be random packet loss. In this case, the systematic packets may be lost, and will be compensated by the coded packets, which constitute the second part of a copy. Thus, in general the download of copies that consists of both systematic and coded packets is considered.

Figure 17:
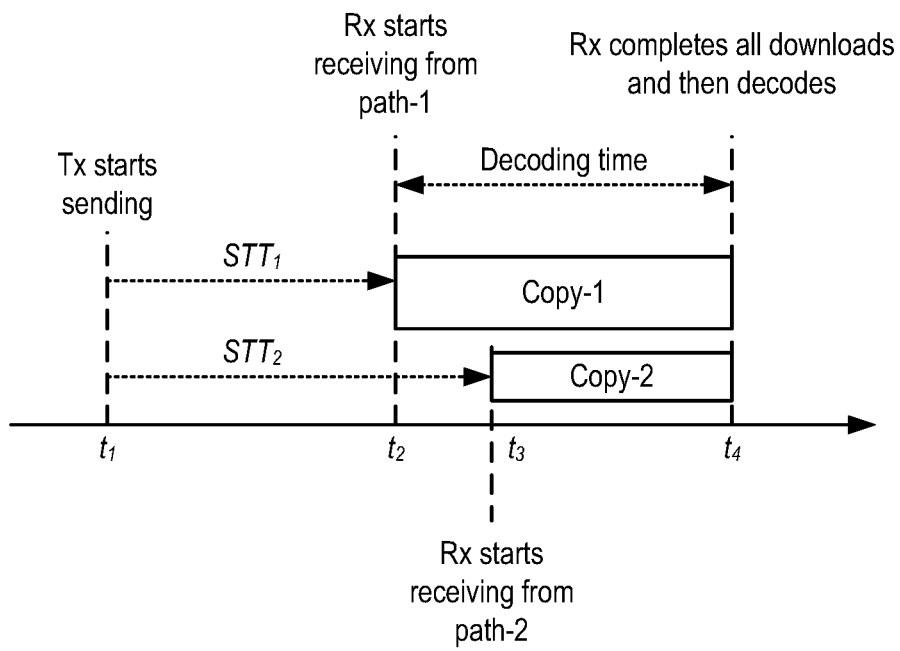
FIG. 17 illustrates an ideal case of simultaneous download completion with packet loss, no redundancy after decoding according to one embodiment.
Figure 18:
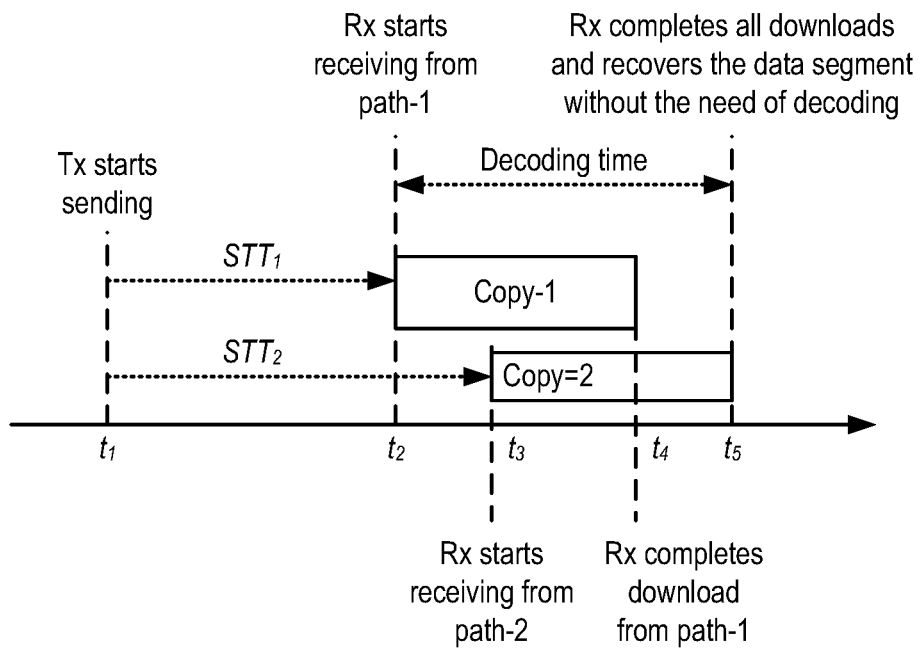
FIG. 18 illustrates asynchronous download times, in which Path-1 is not contributing between t4 and t5 according to one embodiment.

In the ideal example of delivery shown in FIG. 17 (with PLR≥0), {K(n)} of both paths are optimized, so that the two downloads will be completed at the same time t4, and the downloaded packets together are just enough to decode the data segment. This way, the download time (t4−t2) is minimized, which maximizes the throughput. Moreover, since the receiver does not receive any more communication packets of this data segment after t4, the redundancy is minimized to zero.

However, if the number of communication packets sent through each path is sub-optimal, the download of one copy from one path may be completed sooner than the other copy from the other path. In the example in FIG. 18, the receiver completes the download of copy-1 at t4, and the download of copy-2 at t5. Between t4 and t5, path-1 does not contribute to the transportation of the data segment, indicating a deficiency in BW usage and a prolonged decoding time (t5–t2). This yields a suboptimal data throughput.

Figure 19:
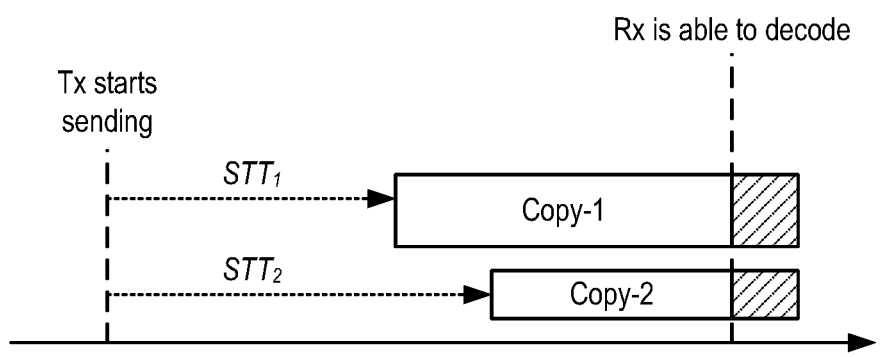
FIG. 19 illustrates a receiver that receives redundant packets from both paths after it has decoded according to one embodiment.

In another example shown in FIG. 19, the server sends too many communication packets, such that the receiver still receives some communication packets of the data segment after the decoding. All these packets are redundant, and are a waste of BW resources. Therefore, the number of communication packets K(n) for each path should be optimized, along with the number S(n) of systematic packets within each K(n).

Moreover, {K(n)} must be further adjusted if the data segment has a limited life span, because this limitation will impose a limited transmission time window, denoted by Tw. For example, in cloud gaming video streaming with 30 fps (frame per second), each video frame is only useful for 33 ms. Thus, the transmission time window is Tw=33 ms, which means that {K(n)} must be small enough to be sent within 33 ms. This restriction further hardens the optimization of {K(n)}.

Therefore, the optimizations of {K(n)} and {S(n)} as used in multipath balancing are highly nontrivial. The optimization algorithm is described below, along with its implementations. However, the multipath load balancing of the present disclosure is first contrasted with traditional multipath load balancing.

Benefits Over Prior Approaches

In various embodiments, the multipath load balancing described herein is different from its traditional counterparts due to a fundamental difference in system model:

Traditional load balancing techniques splits a data stream into independent sub-streams, and route different sub-streams through different paths. This approach incurs packet reordering and buffering problems at the receiver side when the receiver stitches the sub-streams together in order. The problem becomes severe when the paths' quality changes quickly and when there are slow paths.

In the multipath load balancing of the present disclosure, however, all the paths collaboratively transport the same data segment. Thus, the receiver only needs a buffer of size equal to one data segment. Due to the same reason, packet reordering becomes irrelevant.

Load Balancing Algorithm

This section mathematically describes a multipath load balancing algorithm according to various embodiments, which optimizes the number K(n) of communication packets (including S(n) systematic packets, and C(n) coded packets) of each path based on the STT, PLR, BW of each path, and the transmission time window Tw. The algorithm includes three steps:

Optimize the load K(n) of each path based on the STT, PLR, BW of each path, and Tw of the data segment;

Optimize the number of systematic packets S(n) of each path;

Optionally, further increase each K(n) (i.e., send more communication packets), to gain extra robustness against network randomness.

Calculation of Optimal Load {K(n)}

It is assumed that the data segment is partitioned to K data packets, and there are N paths. The time t1 when the server starts to send is set to zero. BWPn denotes the number of communication packets the sender can send through path-n per second (throughput), and BWPRn denotes the number of communication packets the receiver can receive from path-n per second (goodput):

$$BWP_n = \frac{BW_n}{\text{Packet Size}}$$

$$BWPR_n = BWP_n * (1 - PLR_n),$$

where BWn is the BW of path-n with a unit of bytes per second, packet size is the size of each communication packet with a unit of byte, and PLRn is the PLR of path-n.

K(n) denotes the number of communication packets to be sent through path-n. The sent packets will be received by the receiver (with some loss) after a period of:

$$t(n) = STT_n + \frac{K(n)}{BWP_n}$$

The overall delivery time T, i.e., the time to deliver {K(n)} communication packets, is the longest period across all the paths that are used:

$$T = \max[t(n), \forall n : K(n) > 0]$$
$$= \max\left[STT_n + \frac{K(n)}{BWP_n}, \forall n : K(n) > 0\right]$$

A goal is to minimize T by optimizing {K(n)}. The optimization is subject to two constraints:

Transmission time window:

$$K(n) \leq K_{max}(n) = BWP_n * T_w$$

Decoding success: the receiver must receive at least K communication packets to decode the data segment. Since path-n will contribute K(n)*(1−PLRn) packets, the following constraint applies:

$$\sum_{n=1}^{N} K(n) * (1 - PLR_n) \geq K$$

Mathematically, the optimization problem is defined as:
Minimize:

$$T = \max\left[STT_n + \frac{K(n)}{BWP_n}, \forall n : K(n) > 0\right]$$

Subject to:

$$\begin{cases} K(n) \leq BWP_n * T_w, \forall n, \text{ if } T_w \text{ exists.} \\ \sum_{n=1}^{N} K(n) * (1 - PLR_n) \geq K \end{cases}$$

In this optimization, the following first guideline is used regarding priority of the paths: If path-n with STTn is used, then all the other paths with a STT of smaller than STTn must be used as well to maximize the throughput. This guideline holds because the receiver will always start receiving from paths with smaller STT. Thus, by the time the receiver starts receiving from path-n, it will already have received some data from all the paths that have a smaller STT than path-n. There is no reason to exclude these paths.

In addition to the above guideline, the following second guideline is used: If the delivery time T is smaller than the STT of path-n, then path-n is useless (i.e., set K(n)=0).

Without loss of generality, it is assumed that STT1<STT2< . . . <STTN, i.e., the $1^{st}$ path is the shortest. Then, the optimization is achieved using an iterative algorithm. In each of the N'-th iteration (1≤N'≤N), there are three steps:

(a) Motivated by the first guideline above, the load {K(n)} is optimized by assuming that the first N' paths (i.e., those with the smallest STT) are used and that there is no Tw;

(b) If there is Tw that caps the K(n) of some of the used paths, {K(n)} is further adjusted by relocating the leftover packets to other used paths;

(c) Motivated by the second guideline above, the delivery time T is calculated given {K(n)} and it is compared with the STT of path-(N'+1). The iteration is stopped if T is smaller than the STT of path-(N'+1). Otherwise, N' is increased by one and the next iteration is entered until N'=N.

Steps (a) and (b) above are now described in more detail below.

Step (a) Given N', Optimize {K(n)} Without Limited Transmission Time Window

When the first N' (N'≤N) paths are used, the minimum T that allows decoding must satisfy:

$$\sum_{n=1}^{N'}(T - STT_n) * BWPR_n = K$$

Thus, T can be calculated as:

$$T = \frac{K - \sum_{n=1}^{N'} STT_n * BWPR_n}{\sum_{n=1}^{N'} BWPR_n}$$

Once T is obtained, the number K(n) of communication packets of each used path is calculated as:

$$K(n) = BWP_n * (T - STT_n), \ \forall n \in [1, \ldots, N']$$

On the other hand, all the remaining N–N' paths have their K(n)=0.

Step (b) Further Adjust Loads Based on Budget

If the sender (e.g., server) only has a limited time window Tw to send this data segment, the following upper bound on {K(n)} must be imposed:

$$K(n) \le K_{max}(n) = BWP_n * T_w$$

If for path-n its K(n) is larger than Kmax(n), then by reducing K(n) to Kmax(n), the number of communication packets the receiver will receive from this path is reduced by (K(n)–Kmax(n))*(1–PLR(n)). To secure successful decoding, these leftover packets are relocated to the other used paths that have budget, i.e., those with K(n)<Kmax(n). To minimize the delivery time T, the number of packets relocated to each of these paths will be proportional to their BWPRn. In other words, paths with higher goodput will help compensate for more leftover packets.

For example, assume the first N' paths are used. Further assume that the first N*(N*<N') paths have their K(n)>Kmax(n), and the remaining N'–N* paths have their K(n)<Kmax(n) and thus still have budget. Then the total number of leftover packets, denoted by Kleft, is:

$$K_{left} = \sum_{n=1}^{N'}(K(n) - K_{max}(n)) * (1 - PLR_n)$$

These leftover packets are relocated to the remaining N'–N* paths by using their BWPRn as weights.

The total weight is:

$$\text{Total Weight} = \sum\nolimits_{n=N*+1}^{N'} BWPR_n$$

The leftover packets compensated by path-n (N*<n≤N') is:

$$K_{comp}(n) = \frac{K_{left} * BWPR_n}{\text{Total Weight}}$$

For the receiver to receive these packets, the K(n) of path-n (N*<n<=N') must be increased as follows:

$$K(n) = K(n) + \frac{K_{comp}(n)}{1 - PLR_n} = K(n) + \frac{K_{left} * BWP_n}{\text{Total Weight}}$$

Figure 20:
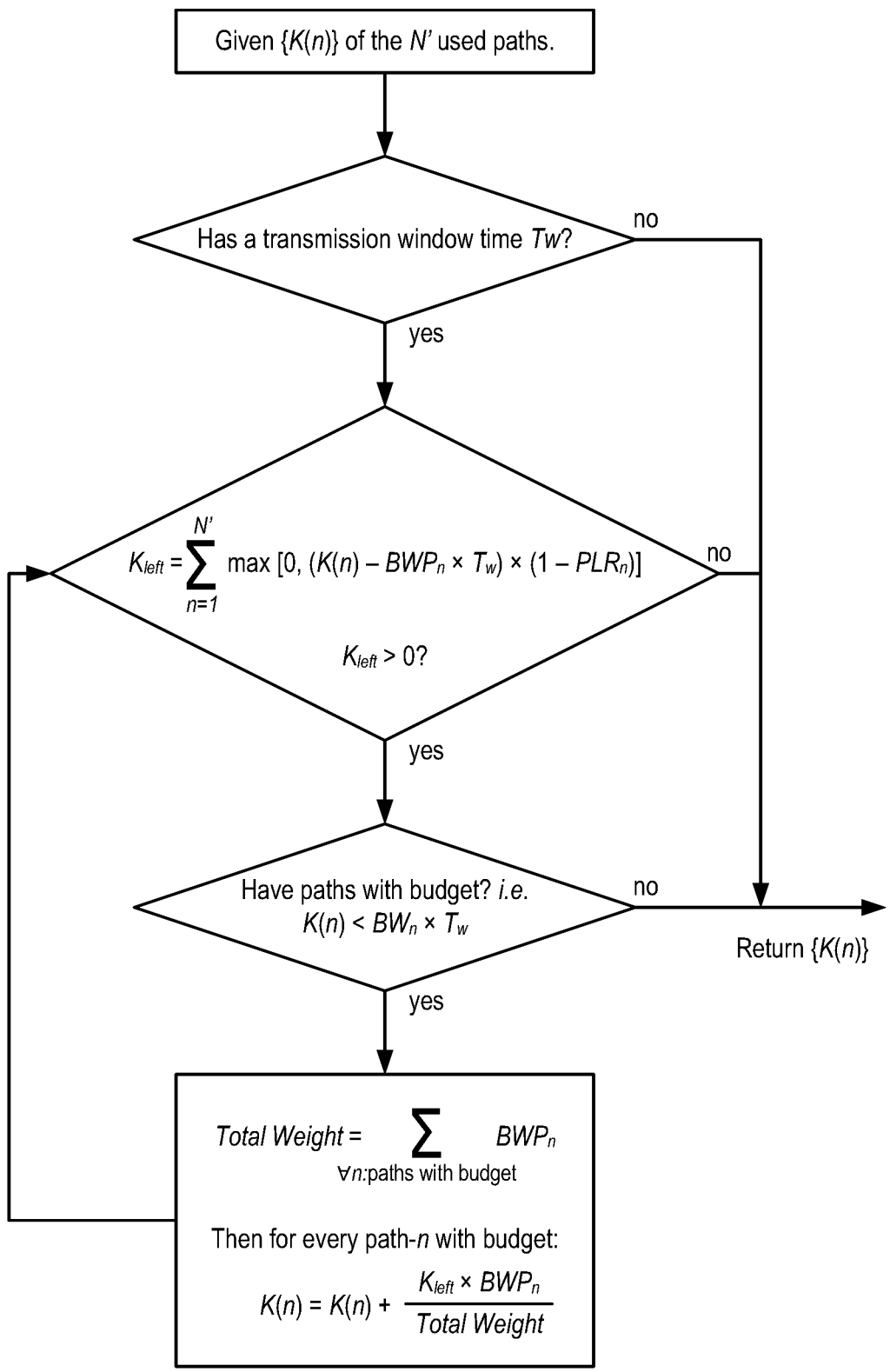
FIG. 20 shows a relocation algorithm when there is a transmission window time that limits {K(n)} according to one embodiment.

Note that this increase may exceed the budget of path-n, yielding new leftover packets. Thus, the above relocation scheme is applied to the N' paths again. The iteration will continue until there are no leftover packets or all paths are full. A flow chart of the relocation algorithm is illustrated in FIG. 20.

After adjusting {K(n)}, the delivery time T is updated using:

$$T = \max\left[STT_n + \frac{K(n)}{BWP_n}, \forall n: K(n) > 0\right]$$

If T<STT–(N'+1) or N'=N, the iteration is stopped. Otherwise, N' is increased by one and the iteration is continued.

Figure 21:
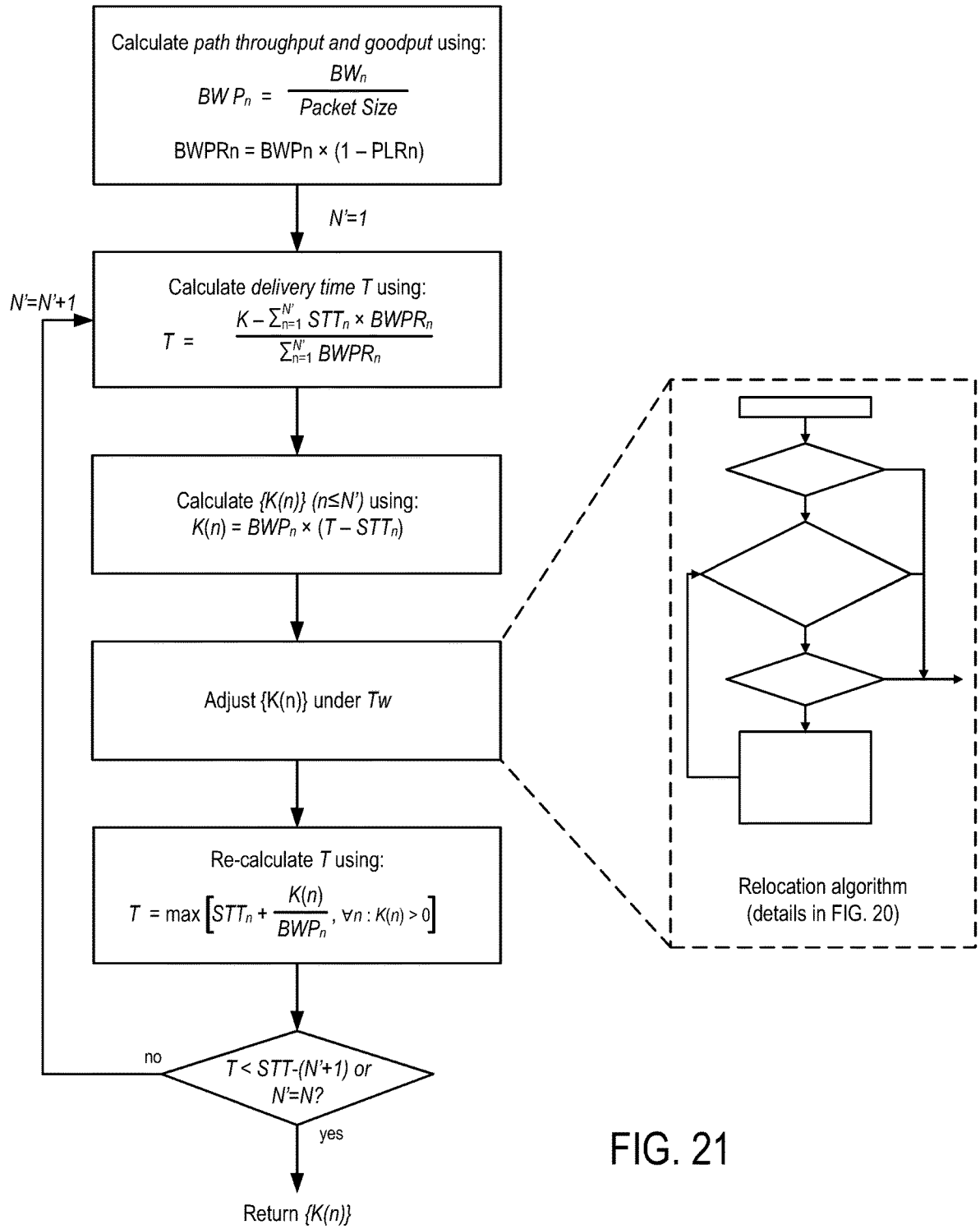
FIG. 21 shows a complete {K(n)} optimization algorithm according to one embodiment.

A flow chart of the complete {K(n)} optimization algorithm is shown in FIG. 21.

Calculation of Optimal Number of Systematic Packets {S(n)}

In various embodiments, there are various {S(n)} optimization strategies that serve different purposes. Two of these optimization strategies are described below.

In some embodiments, it is desired to maximize systematic packet delivery speed. Systematic packets carry original portions of the data segment. Thus, they can directly recover the data segment without any decoding. On the other hand, coded packets cannot be used for recovery until a sufficient number of packets are received.

When the transmission time window is too small for full delivery/recovery and when a subset of the data segment is still useful, it is desirable to maximize the number of systematic packets delivered during this time (i.e., systematic packets delivery speed) for a best-effort partial recovery of the data segment. This is particular useful if each data segment is a video frame, because given that it is hard to fully deliver the frame, it is not desirable to discard this frame. Instead, it is beneficial to reconstruct the frame as much as possible using the systematic packets, and then compensate for the missing part through artefacts.

Accordingly, in a first $\{S(n)\}$ optimization strategy, the systematic packets' delivery speed can be maximized by distributing the K systematic packets to the paths proportionally to their quality, i.e.:

$$S(n) = \frac{K * BWPR_n}{\sum_{\forall n: K(n) > 0} BWPR_n}$$

In one embodiment, this is useful for data streaming within the data segment.

In other embodiments, it is desired to minimize decoding computational complexity by maximizing the number of systematic packets. Decoding consumes computational resources and the battery of the receiver and, thus should be minimized for lightweight receivers such as a mobile phone. Decoding also introduces decoding delay and, thus should be minimized for delay-sensitive applications such as cloud gaming. Systematic packets can be directly used for the recovery of the data segment without decoding. Thus, decoding computational complexity can be minimized by maximizing the number of systematic packets the receiver will receive.

Figure 22:
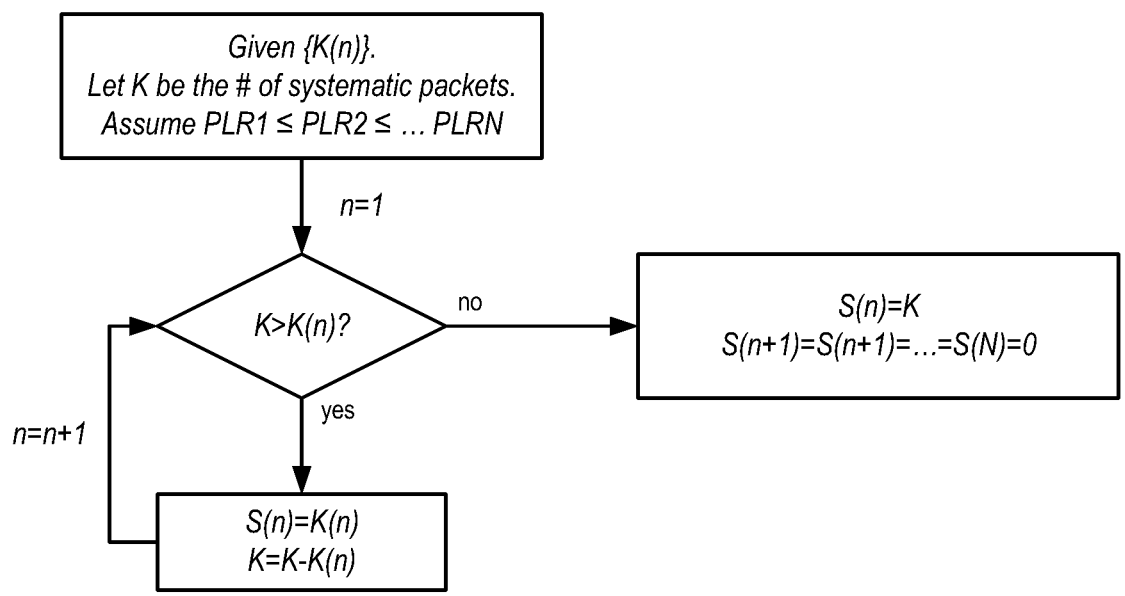
FIG. 22 shows an {S(n)} optimization algorithm that maximizes the number of received systematic packets according to one embodiment.

Accordingly, in a second $\{S(n)\}$ optimization strategy, the decoding computational complexity can be minimized by maximizing the number of systematic packets the receiver will receive. To achieve this, all the systematic packets are allocated to the used paths that have the lowest PLR. This can be done using a simple iterative algorithm: In the n-th iteration, the used path is picked with the n-th lowest PLR and the S(n) of the picked used path is set to K(n). The iteration continues until all the K systematic packets are allocated. FIG. 22 shows a flow chart of this algorithm.

Consequently, there could be three types of used paths: several low PLR paths are used to only send systematic packets, one low PLR paths are used to send both systematic and coded packets (due to there are not enough systematic packets left to fill the K(n) of this path), and all the remaining paths are used to only send coded packets.

Figure 23:
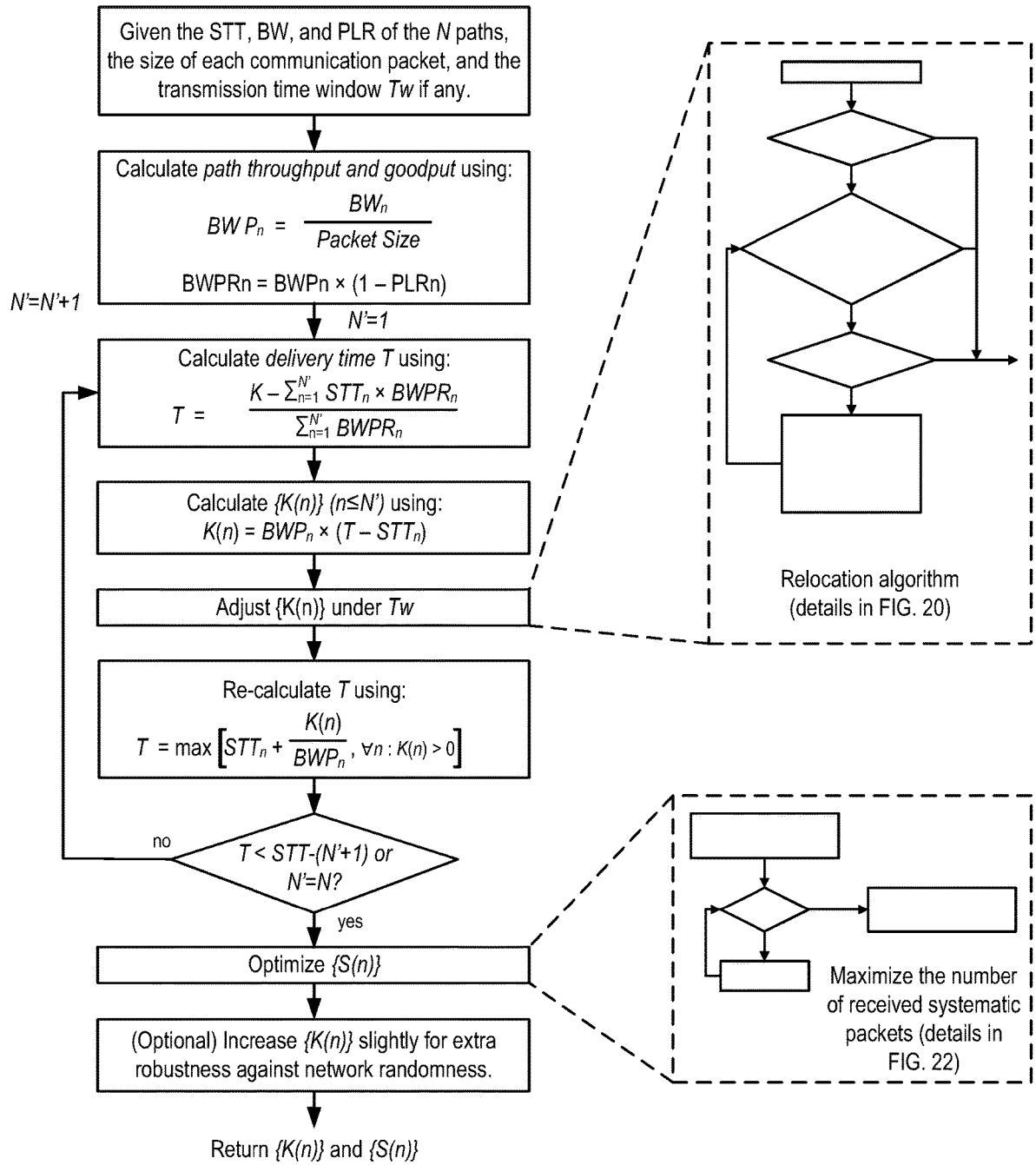
FIG. 23 shows a complete multipath load balancing algorithm according to one embodiment.

FIG. 23 shows a complete multipath load balancing algorithm according to one embodiment.

Addition of Extra Redundancy to $\{K(n)\}$

In various embodiments, $\{K(n)\}$ can be further increased to use redundancy to compensate for network randomness. If a transmission time window Tw is imposed, the redundancy-added $\{K(n)\}$ may be passed to the relocation algorithm above to make sure K(n)<=Kmax(n).

In some embodiments, as just mentioned above, it is desired to use redundancy to compensate for network randomness. Redundant packets are always used as long as network presents randomness, such as packet loss and congestion. This is because such randomness will reduce the number of packets the receiver will receive on time from each path. The shortage in received packets can only be compensated by sending redundant packets. Such redundant packets are thus compulsory.

In addition, network randomness also implies that the estimation on the quality of the paths (e.g., packet loss, STT, bandwidth) may not be accurate. Therefore, it is beneficial to use "extra redundancy" to compensate for estimation offset. These extra redundant packets are optional as long as the estimation is accurate.

In one embodiment, after K(n) is calculated based on the estimation of the path quality, extra redundancy may be added to compensate for estimation offset by further increasing K(n). After such increase, it may not be possible to deliver these K(n) packets within the transmission time window. Thus, K(n) should be further adjusted using the relocation algorithm above that deals with the transmission time window. In one embodiment, the K(n) of unused paths may also be set to a small nonzero value, so that the receiver can probe the quality of these paths (e.g., RTT, BW, and PLR) through downloading a small datagram from them.

Various Implementations

In various embodiments, the multipath load balancing can be implemented at either the server side and the receiver side. When implemented at the server side, the server will determine $\{K(n)\}$ and push the packets to the receiver (such as UDP based transportations). When implemented at the receiver, the receiver will determine $\{K(n)\}$ and pull the packets from the sever (such as HTTP based transportations).

The multipath load balancing can be implemented on top of both reliable protocols (such as TCP) and unreliable protocols (such as UDP). The only difference is that PLR is set to zero when a reliable protocol is used.

Path Prediction

In various embodiments, when performing multipath load balancing, the quality of each path is predicted (e.g., such as its RTT/STT, BW, PLR, etc.). Path prediction techniques can vary from system to system. For example, since TCP is reliable, PLR prediction is not required in TCP-based systems. On the other hand, UDP-based systems require more complicated path prediction techniques.

An example of one prediction technique for UDP-based systems is now described. STT can be readily measured through pinging. Hence, this example only focuses on BW and PLR prediction.

UDP protocol is unreliable. If the transmission rate r does not exceed the path's bandwidth BW, the UDP packets will subject to an inherent network packet loss of PLR. This loss is due to factors such as network noise and interferences and, thus, is inevitable. If the transmission rate r exceeds BW, then on top of the inherence packet loss, all the excessive packets will be lost as well. Therefore, the packet loss Pr observed by the receiver is:

$$P_r = \begin{cases} PLR, & r \leq BW \\ \dfrac{r - BW(1 - PLR)}{r}, & r > BW \end{cases}$$

Figure 24:
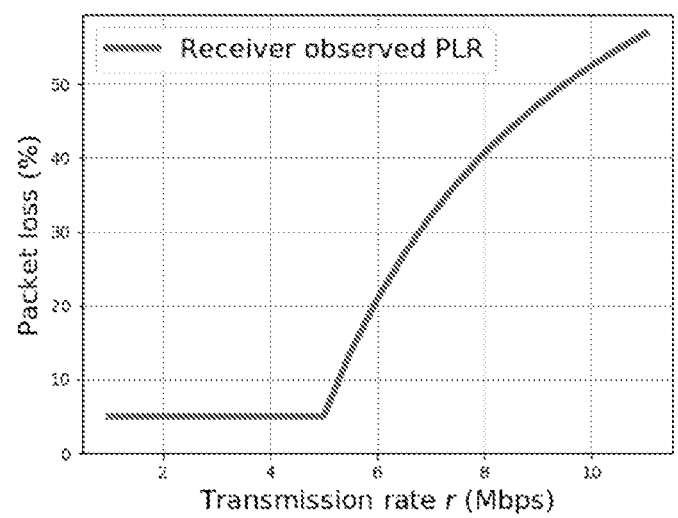
FIG. 24 illustrates an exemplary relation between transmission rate and receiver observed PLR when BW=5 Mbps and PLR=5% according to one embodiment.

Graphically, the relation between transmission rate r and the receiver observed PLR is illustrated in one example in FIG. 24.

Therefore, Pr is a function of r based on PLR and BW. If there are two pairs of rand Pr, say (r1, Pr1) and (r2, Pr2), where r1<BW and r2>BW, BW and PLR can be predicted using standard regression techniques. Such pairs can be obtained by a simple transmission rate control algorithm which increases r gradually until a significant increase in Pr is reported by the receiver.

The predicted BW and PLR of all paths, together with the measured STT, can then be used by the load balancer for multipath load balancing.

The control unit of the multipath data transportation system as described above can be used in various embodiments for maximization of throughput, maximization of robustness, minimization of redundancy, and/or minimization of decoding complexity. It achieves one or more of these benefits by predicting the quality of each path and then balancing the number of communication packets to be sent through each path. For example, the control unit can be used for a coding-aided multipath data transportation system, and the load balancing algorithm solves an optimization problem.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed:

1. A method implemented in a computing apparatus, the method comprising:
    predicting, by the computing apparatus, a quality for each of a plurality of network paths between the computing apparatus and one or more server devices storing a data segment comprising a number of original data packets;
    requesting, by the computing apparatus, the data segment to be received via the plurality of network paths; and
    receiving, by the computing apparatus and in response to requesting the data segment, a plurality of first communication packets via the plurality of network paths, wherein the plurality of first communication packets represent the data segment and includes coded packets that each include modified original information from at least one of a plurality of the original data packets;
    wherein at least some of the first communication packets are received by the computing apparatus in parallel via the plurality of network paths based on the quality predicted for each respective network path.

2. The method of claim 1, wherein each of the plurality of network paths is associated with a single server device storing the data segment.

3. The method of claim 1, wherein the plurality of first communication packets includes systematic packets that each include unmodified original information from a respective original data packet.

4. The method of claim 3, further comprising determining, by the computing apparatus, a number of systematic packets to request for each of the plurality of network paths, wherein the systematic packets are distributed for transmission among the network paths based on the respective number of systematic packets determined for each network path.

5. The method of claim 4, wherein the coded packets are transmitted subsequent to any of the systematic packets transmitted on the same network path.

6. The method of claim 5, wherein each coded packet is generated to be linearly independent of at least one selected from a group consisting of (i) one or more of the systematic packets, (ii) any of the systematic packets that are transmitted on the same network path before each coded packet is transmitted on its respective network path, (iii) any of the systematic packets that are transmitted on any of the plurality of network paths before each coded packet is transmitted on its respective network path, (iv) any of the coded packets that are transmitted on the same network path before each coded packet is transmitted on its respective network path, and (v) any of the coded packets that are transmitted on any of the plurality of network paths before each coded packet is transmitted on its respective network path.

7. The method of claim 4, wherein the systematic packets are distributed among the network paths proportionally to the respective quality predicted for each network path.

8. The method of claim 4, wherein the systematic packets are distributed on a first subset of the plurality of network paths and wherein the coded packets are distributed on a second subset of the plurality of network paths different from the first subset of the plurality of network paths.

9. The method of claim 1, further comprising determining an optimized number of communication packets to request for the respective path, and then increasing the optimized number to provide a total number of communication packets to transmit.

10. The method of claim 9, wherein the data segment has an overall delivery time, and determining the total number of communication packets to request for each respective network path further comprises optimizing the total number based on a minimization of the overall delivery time.

11. The method of claim 9, wherein determining the total number of communication packets to request for each respective network path is further based on a decoding success for each of the plurality of network paths.

12. The method of claim 9, wherein determining the total number of communication packets to request for each respective network path is further based on optimization without a limited transmission time window for the data segment.

13. The method of claim 9, wherein determining the total number of communication packets to request for each respective network path further comprises adjusting a number of communication packets for the respective network path where a limited transmission time window limits the respective network path, wherein adjusting the number of communication packets comprises relocating leftover packets to other network paths that are able to transmit an additional number of communication packets.

14. The method of claim 9, further comprising calculating an overall delivery time for the data segment based on the adjusting of the number of communication packets.

15. The method of claim 1, wherein the coded packets that each include the modified original information from the respective original data packet are generated by modifying original information from the respective original data packet using a forward error correction technique.

16. The method of claim 1, further comprising transmitting, by the computing apparatus, an indication to terminate transmission of generated first communication packets remaining to be transmitted, wherein the indication is transmitted by the computing apparatus in response to a determination that a combined set of received first communication packets is sufficient to recover the data segment.

17. The method of claim 1, further comprising:
determining, by the computing apparatus, a transmission rate for each respective network path based on the quality predicted for the respective network path based on at least one of bandwidth of each respective network path, latency of each respective network path, or packet loss of each respective network path.

18. The method of claim 17, wherein the transmission rate for each respective network path is determined to be equal to the bandwidth of each respective network path.

19. The method of claim 1, further comprising determining a number of network paths to be used for receiving the first communication packets.

20. The method of claim 19, wherein the data segment has a transmission time window, and wherein the number of network paths to be used is based on the transmission time window.

21. A non-transitory computer-readable storage medium storing instructions which, when executed by a computing apparatus, cause the computing apparatus to perform a method, the method comprising:
predicting, by the computing apparatus, a quality for each of a plurality of network paths between the computing apparatus and one or more server devices storing a data segment comprising a number of original data packets;
requesting, by the computing apparatus, the data segment to be received via the plurality of network paths; and
receiving, by the computing apparatus and in response to requesting the data segment, a plurality of first communication packets via the plurality of network paths, wherein the plurality of first communication packets represent the data segment and includes coded packets that each include modified original information from at least one of a plurality of the original data packets;
wherein at least some of the first communication packets are received by the computing apparatus in parallel via the plurality of network paths based on the quality predicted for each respective network path.

22. A computing apparatus, comprising:
at least one processor; and
memory storing instructions, which when executed by the at least one processor, cause the computing apparatus to perform the steps of:
predicting a quality for each of a plurality of network paths between the computing apparatus and one or more server devices storing a data segment comprising a number of original data packets;
requesting the data segment to be received via the plurality of network paths; and
receiving, in response to requesting the data segment, a plurality of first communication packets via the plurality of network paths, wherein the plurality of first communication packets includes represent the data segment and includes coded packets that each include modified original information from at least one of a plurality of the original data packets;
wherein at least some of the first communication packets are received by the computing apparatus in parallel via the plurality of network paths based on the quality predicted for each respective network path.

* * * * *